(12) United States Patent  
Douxchamps et al.

(10) Patent No.: US 8,749,527 B2  
(45) Date of Patent: Jun. 10, 2014

(54) INPUT DEVICE

(75) Inventors: Damien Douxchamps, Ibaraki (JP); Takeshi Fujimori, Ibaraki (JP); Yoshiyuki Sankai, Ibaraki (JP)

(73) Assignees: University of Tsukuba, Ibaraki (JP); CYBERDYNE Inc., Ibaraki (JP)

( * ) Notice: Subject to any disclaimer, the term of this patent is extended or adjusted under 35 U.S.C. 154(b) by 274 days.

(21) Appl. No.: 13/265,180

(22) PCT Filed: Mar. 19, 2010

(86) PCT No.: PCT/JP2010/054833  
§ 371 (c)(1),  
(2), (4) Date: Oct. 26, 2011

(87) PCT Pub. No.: WO2010/122865  
PCT Pub. Date: Oct. 28, 2010

(65) Prior Publication Data  
US 2012/0032926 A1  Feb. 9, 2012

(30) Foreign Application Priority Data

Apr. 23, 2009  (JP) ................................ 2009-104757

(51) Int. Cl.  
*G09G 5/00* (2006.01)  
*G06F 3/033* (2013.01)  
*G06F 3/041* (2006.01)  
*G06F 3/042* (2006.01)  
*G06K 11/06* (2006.01)  
*G08C 21/00* (2006.01)

(52) U.S. Cl.  
USPC .......... 345/175; 345/156; 345/157; 345/173; 345/176; 178/18.01; 178/18.09

(58) Field of Classification Search  
USPC .......................... 345/156, 157, 173, 175, 176; 178/18.01, 18.09  
See application file for complete search history.

(56) References Cited

U.S. PATENT DOCUMENTS 4,812,830 A * 3/1989 Doering ....................... 345/175  
5,243,332 A   9/1993 Jacobson  
5,311,206 A * 5/1994 Nelson ........................... 345/89

(Continued)

FOREIGN PATENT DOCUMENTS

CN  101321986 A  12/2008  
JP  02-299110     12/1990

(Continued)

OTHER PUBLICATIONS

International Search Report mailed on Jun. 22, 2010.

(Continued)

*Primary Examiner* — Ilana Spar  
(74) *Attorney, Agent, or Firm* — IPUSA, PLLC

(57) ABSTRACT

An input device includes a transparent display panel configured to display a graphical interface, an input plate disposed above the display panel and composed of a material that transmits the graphical interface and allows infrared light to propagate through the input plate, an infrared-emitting unit disposed in contact with the input plate and configured to emit the infrared light into the input plate via a contact surface of the input plate, and an infrared detection unit disposed below the input plate and configured to detect diffused light of the infrared light which is generated at the input plate when the input plate is touched.

12 Claims, 21 Drawing Sheets

(56) References Cited

U.S. PATENT DOCUMENTS

| | | | |
|---|---|---|---|
| 5,420,603 A * | 5/1995 | Tsuboyama et al. | 345/87 |
| 7,714,953 B2 * | 5/2010 | Murakami | 349/58 |
| 8,189,128 B2 * | 5/2012 | Takahashi et al. | 349/12 |
| 8,353,457 B2 * | 1/2013 | Olmstead | 235/462.41 |
| 2005/0099372 A1 | 5/2005 | Nakamura et al. | |
| 2008/0029691 A1 | 2/2008 | Han | |
| 2008/0055495 A1 | 3/2008 | Cernasov | |
| 2008/0062156 A1 | 3/2008 | Abileah et al. | |
| 2008/0192025 A1 | 8/2008 | Jaeger et al. | |
| 2008/0231564 A1 | 9/2008 | Harada et al. | |
| 2011/0141064 A1 * | 6/2011 | Suggs | 345/175 |

FOREIGN PATENT DOCUMENTS

| | | |
|---|---|---|
| JP | 06-186560 | 7/1994 |
| JP | 2006-079499 | 3/2006 |
| JP | 2006079499 A * | 3/2006 |
| JP | 2007-156648 | 6/2007 |
| JP | 2007156648 A * | 6/2007 |
| JP | 2007-187753 | 7/2007 |
| WO | WO 2008/120891 A1 | 10/2008 |

OTHER PUBLICATIONS

Extended European Search Report dated Sep. 18, 2013.

* cited by examiner

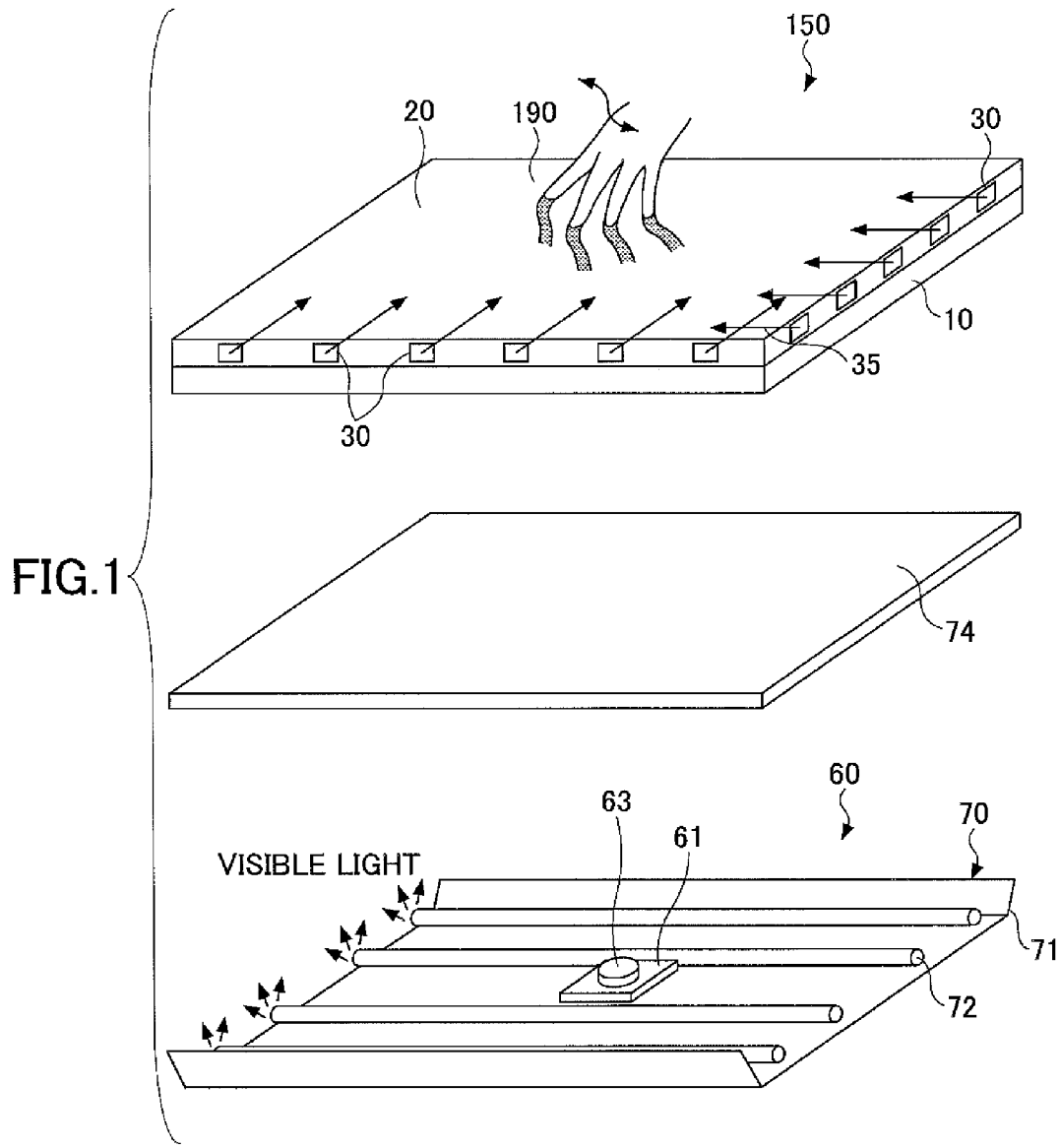

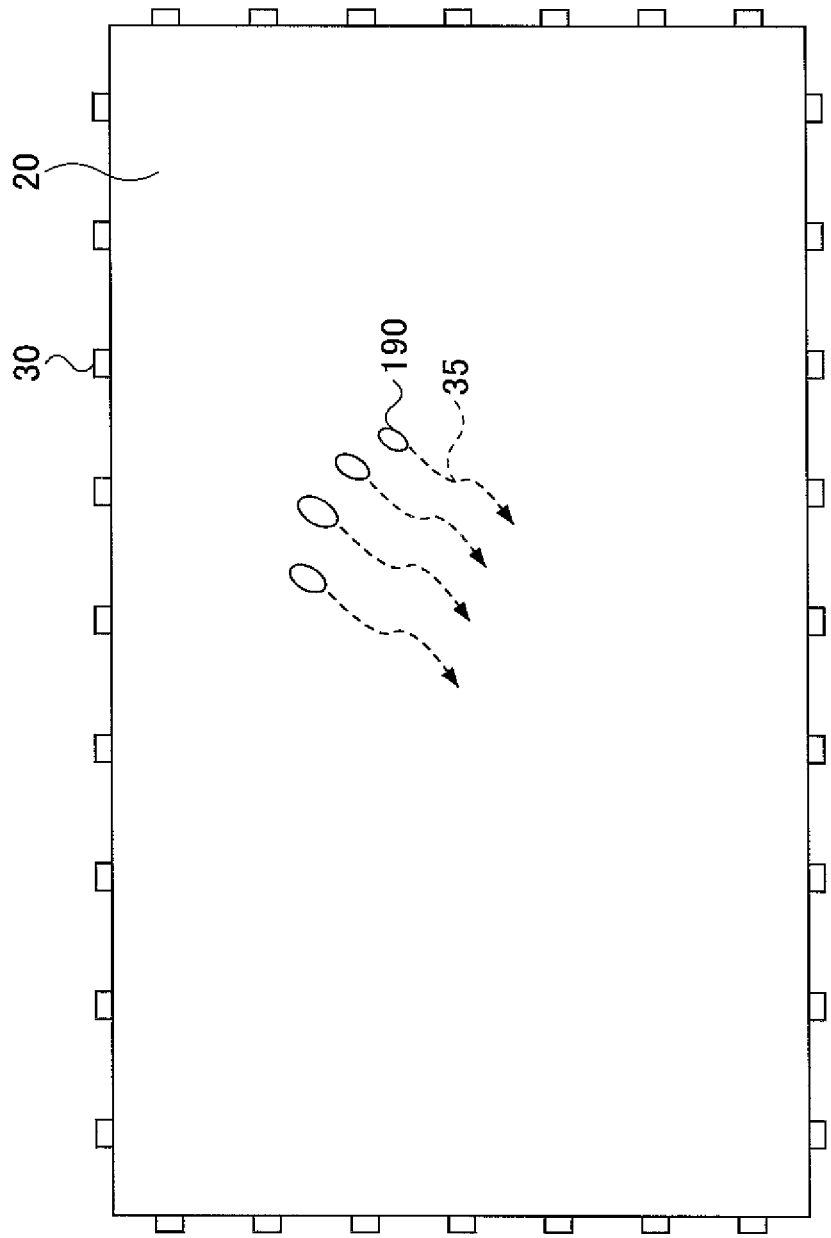

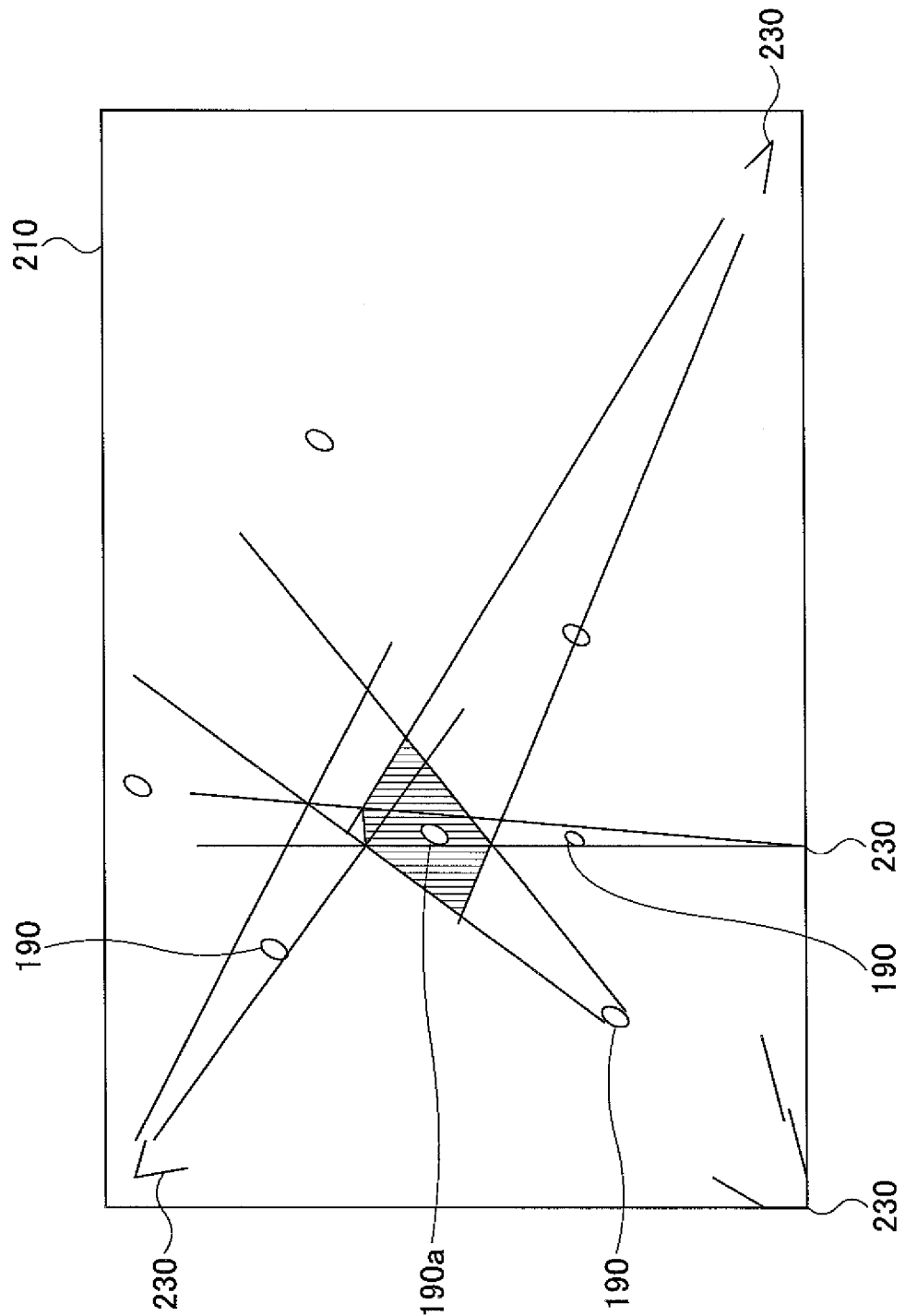

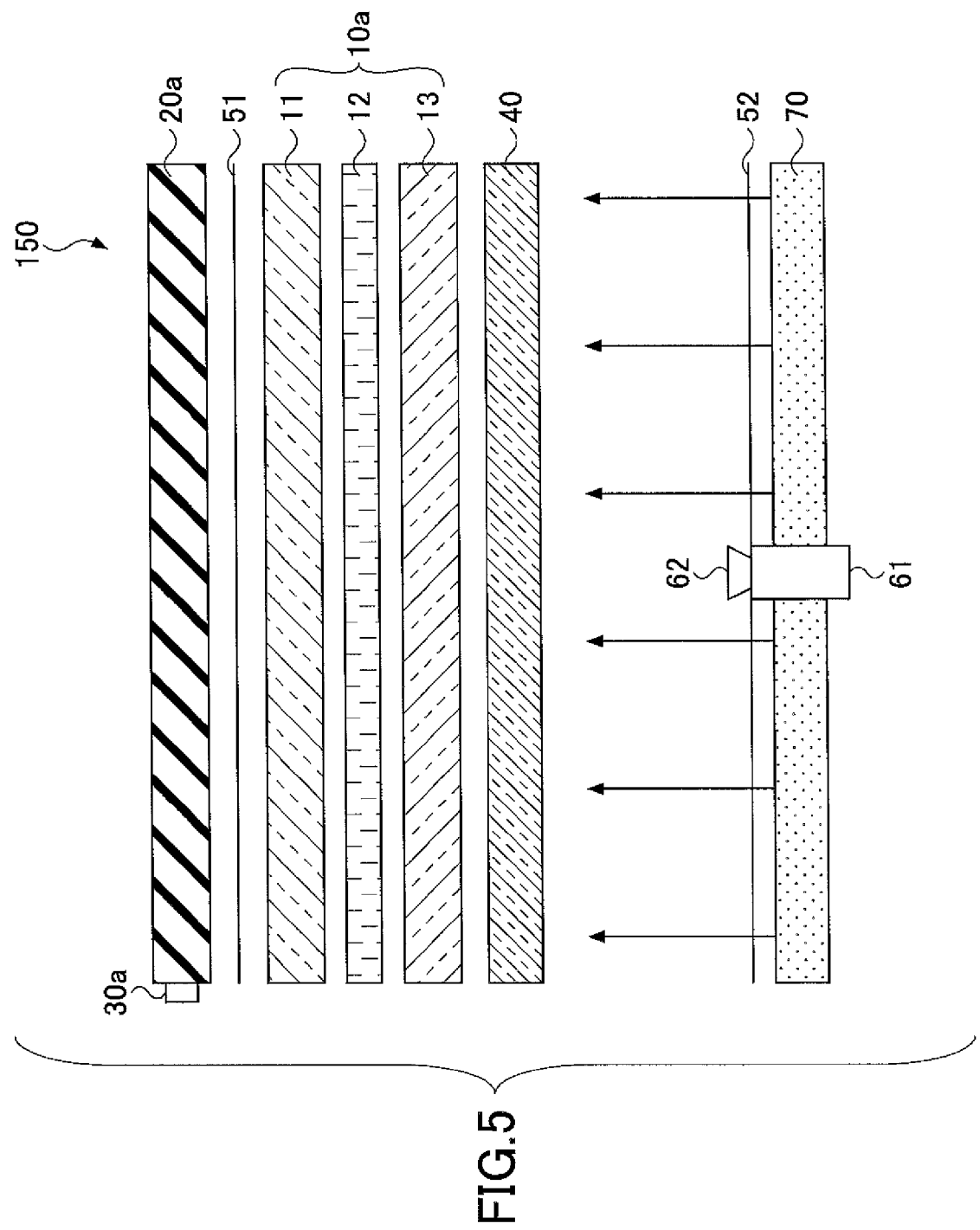

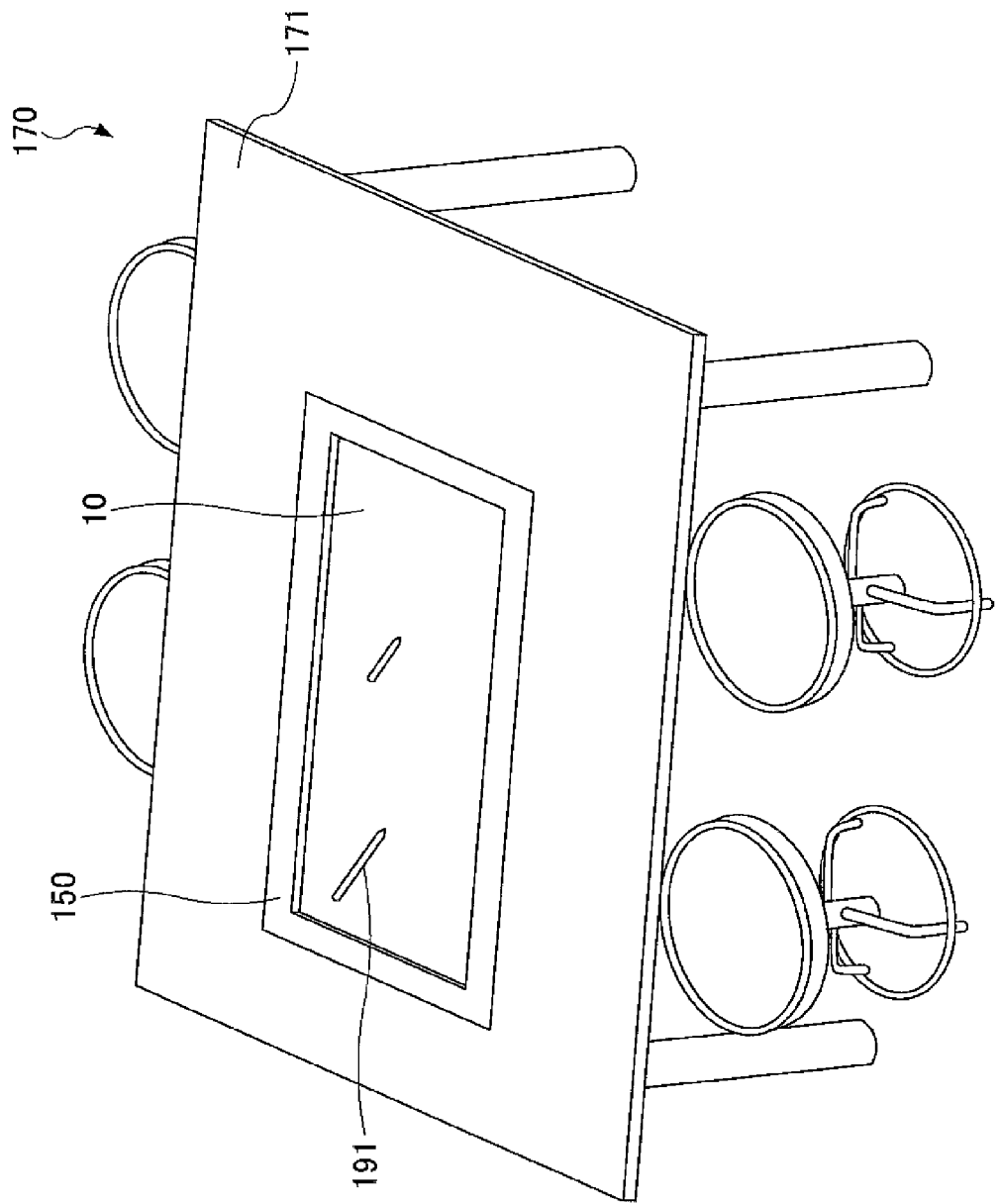

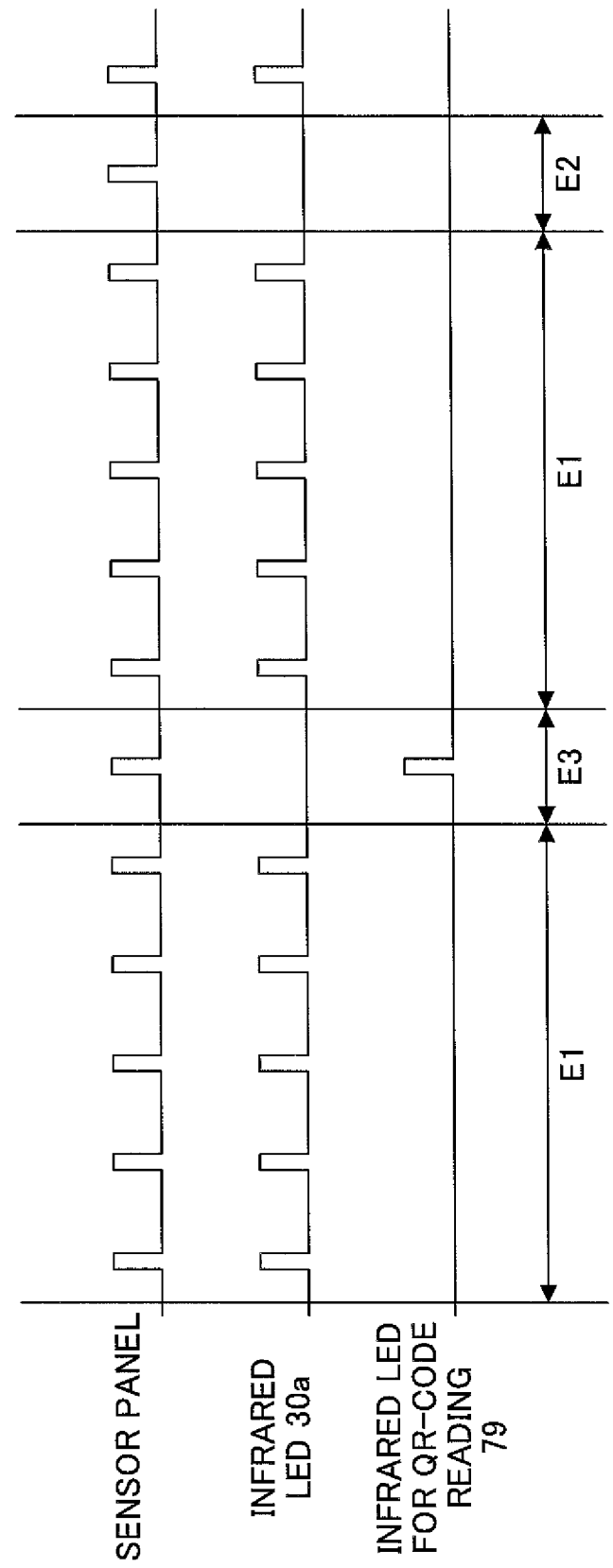

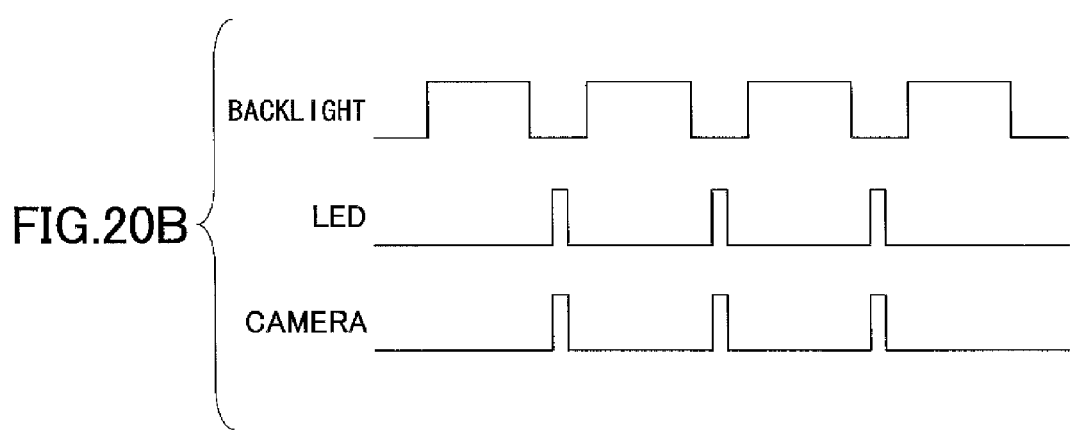

INPUT DEVICE

TECHNICAL FIELD

The present invention generally relates to an input device. More particularly, the present invention relates to an input device including a transparent display panel for displaying a graphical interface.

BACKGROUND ART

Display devices such as a touch panel including an input function in addition to a display function are widely used.

For example, patent document 1 discloses a liquid crystal display device that includes a liquid crystal display panel, imaging units each including an imaging optical system, detection light sources for emitting detection light with a wavelength in the infrared region along a viewer side of the liquid crystal display panel, and a backlight unit. The backlight unit includes light sources and an optical layer and is disposed such that a space is formed between the backlight unit and the liquid crystal display panel.

With the disclosed liquid crystal display device, display images are displayed on the liquid crystal display panel using the backlight unit, and images indicating touched positions in an input operation are obtained using the detection light sources and the imaging units. The detection light sources are arranged along the edges of a display area of the liquid crystal display panel so as to surround the display area. The imaging units are disposed inside of the backlight unit. Each of the imaging units receives the detection light that passes through the liquid crystal display panel and the imaging optical system from the viewer side and thereby obtains an image of the viewer side of the liquid crystal display panel. Also, fluorescent parts that transmit the detection light are provided in areas of the optical layer corresponding to the optical paths of the detection light entering the imaging units. The fluorescent parts absorb excitation light and emit visible light. This configuration makes it possible to prevent the imaging units from being viewed from the outside and to display high-quality images.

[Patent document 1] Japanese Laid-Open Patent Publication No. 2007-187753

DISCLOSURE OF INVENTION

Problems to be Solved by the Invention

With the configuration of patent document 1, however, since the detection light sources are disposed around the viewer side of the liquid crystal display panel, an inside finger of the viewer (or user) in the optical path of a detection light source is shaded by an outside finger in the same optical path. In other words, in a "multi-touch" input operation using, for example, fingers, some of the fingers are not illuminated with the detection light and as a result, images of all touch points are not obtained. Thus, the disclosed technology is not suitable for multi-touch input.

An aspect of the present invention provides an input device that can accurately detect multi-touch input operations.

Means for Solving the Problems

According to an embodiment of the present invention, an input device includes a transparent display panel configured to display a graphical interface, an input plate disposed above the display panel and composed of a material that transmits the graphical interface and allows infrared light to propagate through the input plate, an infrared-emitting unit disposed in contact with the input plate and configured to emit the infrared light into the input plate via a contact surface of the input plate, and an infrared detection unit disposed below the input plate and configured to detect diffused light of the infrared light which is generated at the input plate when the input plate is touched.

Advantageous Effect of the Invention

An aspect of the present invention makes it possible to accurately detect multi-touch input operations.

BRIEF DESCRIPTION OF THE DRAWINGS

FIG. 1 is an exploded perspective view illustrating a configuration of an input device according to a first embodiment of the present invention;

FIG. 3 is a drawing illustrating an exemplary image of a back surface of an input plate;

FIG. 4 is a drawing illustrating a liquid-crystal display device including a related-art input function as a comparative example;

FIG. 5 is a drawing illustrating a cross section of an input device of the first embodiment;

FIG. 14 is a drawing illustrating an exemplary table interface including an input device of the first embodiment;

FIG. 19B is a timing chart used to describe an exemplary operation of an input device of the sixth embodiment;

FIG. 20B is a timing chart illustrating exemplary output timing of trigger signals in an input device of the seventh embodiment.

EXPLANATION OF REFERENCES

Figure 2A:
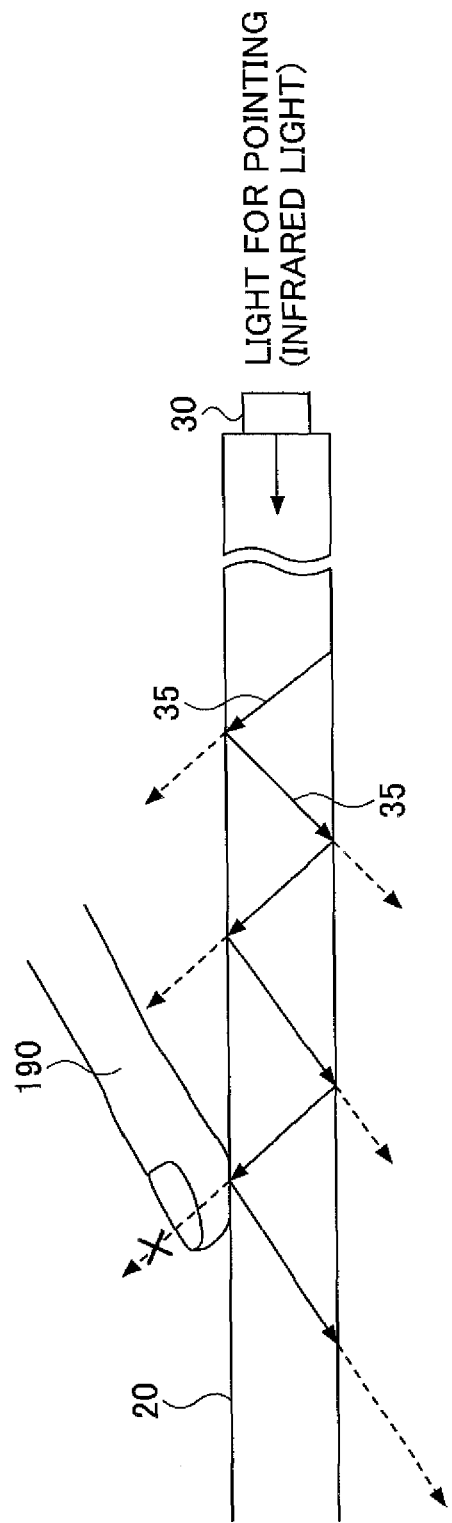
FIG. 2A is a drawing illustrating a path of a ray of infrared light in an input device of the first embodiment.

10 Display panel
10a Liquid crystal panel
11, 13 Glass substrate
12 Liquid crystal layer
14, 75 Diffusion film
15 Pixel
16, 17, 18, 19 Cell
20 Input plate
20a, 20b, 20c, 20d Acrylic plate
21 Protection film
22 Hole
23 Mirror
30 Infrared-emitting unit
30a, 79, 193 Infrared-emitting diode
31 Infrared-emitting-diode drive board
32 Transparent bond
40 Glass support plate
50, 51, 52 Polarizing plate
60 Infrared detection unit
61 Infrared camera
62 Lens
63 Filter
64 Solid-state image sensor
65 Camera case
66 Infrared sensor
70 Backlight
71 Chassis
72 Fluorescent tube
73, 90 Reflecting plate
74 Diffusion plate
76 Frame
77 Opening
78 White light-emitting diode
80 Spacer
100 Casing
110 Control unit
120 Inverting unit
130 Modulation unit
150-156 Input device
170 Table interface
171 Table
190, 190a Finger
191 Pen
192 Pointer
194 QR code

BEST MODE FOR CARRYING OUT THE INVENTION

Preferred embodiments of the present invention are described below with reference to the accompanying drawings.

First Embodiment

FIG. 1 is an exploded perspective view illustrating a configuration of an input device 150 according to a first embodiment of the present invention. As illustrated in FIG. 1, the input device 150 of the first embodiment includes a display panel 10, an input plate 20, infrared-emitting units 30, and an infrared detection unit 60.

The display panel 10 displays a graphical interface. An operator touches the graphical interface such as operation buttons displayed on the display panel 10 with fingers or a pen to input various commands. In the example of FIG. 1, the operator touches the graphical interface with fingers 190 to input commands.

The display panel 10 may be, but is not limited to, a liquid crystal panel. When the display panel 10 is implemented by a liquid crystal panel, the input device 150 may further include a backlight 70. The backlight 70 includes a chassis 71, fluorescent tubes 72, and a diffusion plate 74.

The input plate 20 is a plate-like part used by the operator to input commands. The input plate 20 is disposed above the display panel 10, and transmits the graphical interface displayed on the display panel 10. Accordingly, the input plate 20 is implemented by a transparent part. Also, the input plate 20 is composed of a material that allows infrared light to propagate. Any transparent material that allows infrared light to propagate may be used for the input plate 20. For example, an acrylic plate or crystal glass may be used for the input plate 20.

The infrared-emitting units 30 emit infrared light into the input plate 20 from side surfaces of the input plate 20. In the input device 150 of the first embodiment, infrared light 35 is emitted by the infrared-emitting units 30 from side surfaces of the input plate 20 into the input plate 20. The infrared light 35 propagates through the input plate 20 and is diffused when an input operation is performed. The input operation is detected by detecting the diffused infrared light 35. The infrared-emitting units 30 are provided as infrared light sources that emit the infrared light 35 into the input plate 20 to enable detection of input operations using the infrared light 35. Any device that can emit the infrared light 35 from the side surfaces of the input plate 20 may be used as the infrared-emitting unit 30. For example, an infrared-emitting diode may be used for the infrared-emitting unit 30.

The infrared detection unit 60 detects infrared light and is disposed below the input plate 20. In the input device 150 of this embodiment, the infrared detection unit 60 detects the infrared light 35 diffused when the fingers 190 touch the input plate 20. Input positions on the input plate 20 touched by the operator are detected by detecting the diffused infrared light 35. Any type of detection device capable of detecting the infrared light 35 may be used as the infrared detection unit 60. For example, an infrared imaging unit such as an infrared camera 61 may be used as the infrared detection unit 60. Thus, an image of the back surface of the input plate 20 being touched by the fingers 190 is obtained to detect the positions of the fingers 190.

Assuming that the infrared camera 61 is used as the infrared detection unit 60, the infrared camera 61 may include a filter 63 that transmits only the infrared light 35 and does not transmit other types of light such as visible light. The filter 63 prevents interference by light such as visible light other than the infrared light 35, makes it possible to detect only the diffused infrared light 35 from the input plate 20, and thereby makes it possible to accurately detect input positions.

The backlight 70 emits visible light to illuminate the liquid crystal panel 10 from its back surface and thereby make images visible on the front surface on the liquid crystal panel 10. The backlight 70 may include, for example, the chassis 71, the fluorescent tubes 72, and the diffusion plate 74. The fluorescent tubes 72 provided on the chassis 71 are turned on to emit visible light and the visible light is diffused by the diffusion plate 74 to illuminate the liquid crystal panel 10 from the back surface. This configuration makes it possible to evenly display the graphical interface on the liquid crystal panel 10.

As illustrated in FIG. 1, the infrared detection unit 60 may be placed in the back light 70. When a liquid crystal panel is used as the display panel 10 and the backlight 70 is provided, placing the infrared detection unit 60 in the backlight 70 makes it possible to save the space for the infrared detection unit 60.

Meanwhile, when a light-emitting display panel such as a plasma display panel or an organic electroluminescence (EL) display panel is used as the display panel 10, the backlight 70 is not necessary. In this case, the infrared detection unit 60 may be placed, for example, in a cell forming a pixel of the display panel 10 or on a back side chassis.

Figure 2B:
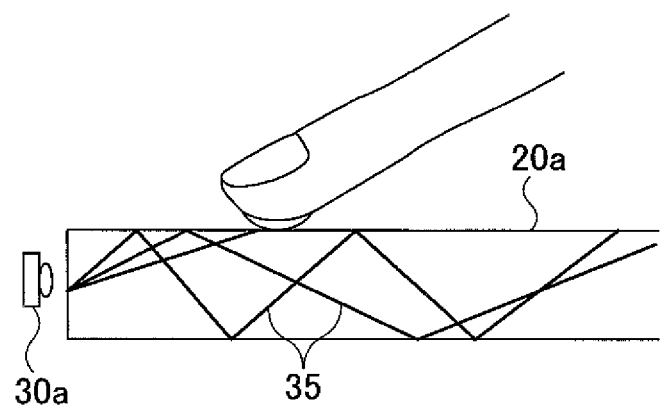
FIG. 2B is a drawing illustrating propagation of infrared light in a more realistic manner than in FIG. 2A.

FIGS. 2A and 2B are drawings used to describe a mechanism for detecting input operations on the input device 150 of the first embodiment. FIG. 2A is a drawing illustrating a path of a ray of the infrared light 35. In FIG. 2A, the infrared light 35 is emitted by the infrared-emitting unit 30 from a side surface of the input plate 20. The emitted infrared light 35 is reflected and transmitted repeatedly and propagates through the input plate 20. In FIG. 2A, solid arrow lines indicate reflected light and dotted arrow lines indicate transmitted light. At the position where the finger 90 is present, the transmitted light is blocked by the finger 90. As a result, the intensity of downward transmitted light increases. Thus, the manner of propagation of the infrared light 35 at a position where the finger 190 is present is different from that at a position where the finger 190 is not present. Therefore, it is possible to detect the presence of the finger 190 by detecting disturbance of the infrared light 35, i.e., diffused infrared light.

FIG. 2B is a drawing illustrating propagation of the infrared light 35 in a more realistic manner than in FIG. 2A. In FIG. 2B, it is assumed that an infrared-emitting diode 30a is used as the infrared-emitting unit 30 and an acrylic plate 20a is used as the input plate 20. The infrared-emitting diode 30a is attached to a side surface of the acrylic plate 20a and the infrared light 35 enters the acrylic plate 20a from the side surface. The infrared light 35 entering the acrylic plate 20a propagates through the acrylic plate 20a while being reflected in various directions. When the finger 190 touches the acrylic plate 20a, the infrared light 35 is diffused at the touched position. When the acrylic plate 20a is seen from the underside, a bright circular area is identified around the touched position. An image of the back surface of the acrylic plate 20a is obtained by the infrared detection unit 60 such as the infrared camera 61 and the bright circular area in the obtained image is identified to detect the finger 190.

FIG. 3 is a drawing illustrating an exemplary image of the back surface of the input plate 20 obtained by the infrared detection unit 60 such as the infrared camera 61. Although the infrared-emitting units 30 are not scanned in an actual case, they are shown in FIG. 3 to facilitate understanding. When the infrared light 35 is emitted by the infrared-emitting units 30 into the input plate 20, the infrared light 35 is randomly reflected and diffused and propagates through the input plate 20. As a result, the input plate 20 is sufficiently filled with the infrared light 35 and the intensity of the infrared light 35 in the input plate 20 becomes uniform. When the input plate 20 in such a condition is touched by the fingers 190, the infrared light 35 is diffused or scattered by the fingers 190 and the intensity of the infrared light 35 increases at the touched positions. As a result, bright circular areas are detected at the touched positions. In the example of FIG. 3, four circular areas corresponding to four fingers 190 are detected. Thus, the input device 150 of this embodiment is capable of detecting multi-touch input operations. Since the input plate 20 is uniformly and sufficiently filled with the infrared light 35, the infrared light 35 is diffused at any touched point on the input plate 20 without being affected by other touched points. This in turn makes it possible to detect the fingers 190 touching the input plate 20 as points on a two-dimensional plane.

FIG. 4 is a drawing illustrating a liquid-crystal display device including a related-art input function as a comparative example. In FIG. 4, infrared-emitting units 230 are provided above the periphery of a liquid crystal panel 210 to emit infrared light toward a display area of the liquid crystal panel 210. Accordingly, the infrared light propagates through the air. With this configuration, a finger 190a located at an inner position on the liquid crystal panel 210 is shaded by other fingers 190 located at outer positions and is therefore not illuminated by the infrared light. If there is an area shaded from the infrared light, it becomes difficult to accurately detect multi-touch input operations.

Meanwhile, with the input device 150 of the first embodiment described with reference to FIGS. 1 through 3, it is possible to accurately detect multiple touch points because the infrared light 35 propagates through the input plate 20 and is not blocked by the fingers 190.

FIG. 5 is a drawing illustrating a cross section of the input device 150 of the first embodiment. In FIG. 5, it is assumed that the liquid crystal panel 10a is used as the display panel 10, the acrylic plate 20a is used as the input plate 20, and the infrared camera 61 is used as the infrared detection unit 60.

The input device 150 of FIG. 5 includes the liquid crystal panel 10a, the acrylic plate 20a, the infrared-emitting diodes 30a, a glass support plate 40, polarizing plates 51 and 52, the infrared camera 61, and the backlight 70.

The liquid crystal panel 10a includes an upper glass substrate 11, a liquid crystal layer 12, and a lower glass substrate 13. The liquid crystal layer 12 is supported between the upper glass substrate 11 and the lower glass substrate 13. The upper glass substrate 11 and the lower glass substrate 13 may have a thickness of, for example, about 0.7 mm, and the entire liquid crystal panel 10a may have a thickness of, for example, about 2 mm.

The acrylic plate 20a is disposed above the liquid crystal panel 10a. The infrared-emitting diodes 30a are attached to the side surfaces of the acrylic plate 20a. The acrylic plate 20a is transparent and allows the infrared light 35 to propagate therethrough. Since an acrylic plate is inexpensive, using the acrylic plate 20a as the input plate 20 makes it possible to reduce the costs of the input device 150.

Each of the infrared-emitting diodes 30a may have a cuboid shape and the length of an edge of a rectangular surface of the infrared-emitting diode 30a may be, for example, about 3 to 5 mm. In this case, the acrylic plate 20a may have a thickness of, for example, about 3 to 5 mm. That is, the thickness of the acrylic plate 20a may be set at any appropriate value that is sufficient to accommodate the infrared-emitting diode 30a.

The glass support plate 40 is preferably provided below the acrylic plate 20a since the acrylic plate 20a itself is soft and tends to be deformed downward when pressed with the fingers 190.

The infrared-emitting diode 30a is preferably attached to a side surface of the acrylic plate 20a such that the infrared-emitting diode 30a is in optical contact with the acrylic plate 20a and the optical distance between the infrared-emitting diode 30a and the acrylic plate 20a becomes zero. In other words, the infrared-emitting diode 30a is preferably fixed to the acrylic plate 20a with the side surface as a contact surface such that the infrared light 35 enters the acrylic plate 20a from the contact surface. Multiple infrared-emitting diodes 30a may be arranged at predetermined intervals on the side surfaces of the acrylic plate 20a. Providing multiple infrared-emitting diodes 30a makes it possible for the infrared light 35 to uniformly enter into the acrylic plate 20a. For this reason, the infrared-emitting diodes 30a are preferably provided on multiple side surfaces of the acrylic plate 20a, and more preferably on all four side surfaces of the acrylic plate 20a.

As described above, when a soft material such as the acrylic plate 20a is used as the input plate 20, the strength of the input plate 20 used as the input operation surface of the input device 150 may become insufficient. The glass support plate 40 is used to provide sufficient strength to the input device 150. For this purpose, the glass support plate 40 supports the acrylic plate 20 from below. In the example of FIG. 5, the glass support plate 40 supports the acrylic plate 20a from below via the liquid crystal panel 10a. The glass support plate 40 is composed of transparent glass to transmit light from the backlight 70 located below the glass support plate 40 and to transmit the infrared light 35 from the acrylic plate 20a located above the glass support plate 40.

The components from the uppermost acrylic plate 20a to the lowermost glass support plate 40 are integrated as one unit.

The infrared camera 61 obtains an image indicating positions of the fingers 190 touching the acrylic plate 20a used as the input plate 20. The infrared camera 61 is disposed below the acrylic plate 20a. Since the components from the acrylic plate 20a to the glass support plate 40 are integrated as one unit, the infrared camera 61 is placed in a position lower than the glass support plate 40. The distance between the glass support plate 40 and the infrared camera 61 may be, for example, about 20 to 25 cm. This distance may be determined taking into account the detection range of the infrared camera 61. The infrared camera 61 receives the infrared light 35 that is output downward from the acrylic plate 20a and transmitted by the liquid crystal panel 10a and the glass support plate 40, and thereby obtains an image of the back surface of the acrylic plate 20a.

One or more infrared cameras 61 may be provided. Using multiple infrared cameras 61 makes it possible to reduce the imaging area of each of the infrared cameras 61. This in turn makes it possible to improve the imaging accuracy, to reduce the distance between the glass support plate 40 and the infrared cameras 61, and thereby to reduce the thickness of the input device 150. Thus, the input device 150 may include multiple infrared cameras 61.

The backlight 70 illuminates the back surface of the liquid crystal panel 10a to increase the brightness of the graphical interface displayed on the liquid crystal panel 10a.

The polarizing plates 51 and 52 transmit only polarized light components in predetermined directions. In general, polarizing plates are provided on the front and back surfaces of a liquid crystal panel. However, in the input device 150 of this embodiment, the polarizing plate 51 is provided on the front surface of the liquid crystal panel 10a and the polarizing plate 52 is provided on the front surface of the backlight 70. The polarizing plate 52 has an opening at a position corresponding to a lens 62 of the infrared camera 61 so as not to cover the lens 62. The polarizing plate 52 is necessary to display an image on the liquid crystal panel 10a. However, the polarizing plate 52 attenuates the diffused infrared light 35 from the acrylic plate 20a. For this reason, the polarizing plate 52 is configured such that light emitted upward from the backlight 70 passes through the polarizing plate 52 and the diffused infrared light 35 from the acrylic plate 20a is directly received by the infrared camera 61 without passing through the polarizing plate 52.

The image obtained by the infrared camera 61 may be output, for example, to an arithmetic unit such as a (micro) computer to perform an image recognition process on the image and thereby to detect an input operation.

Figure 6:
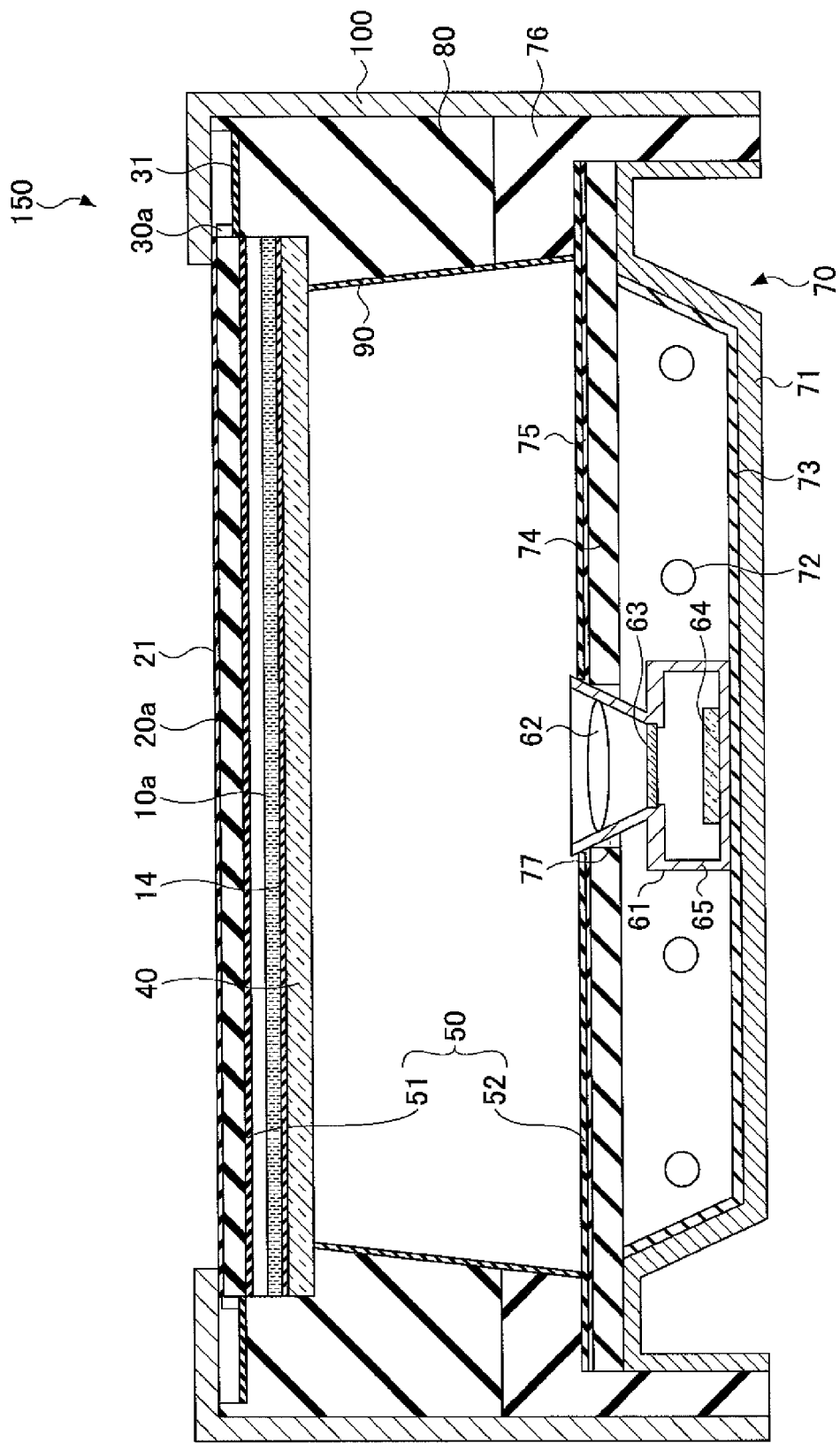
FIG. 6 is a cut-away side view of an input device of the first embodiment.

An exemplary configuration of the input device 150 of the first embodiment is described in more detail with reference to FIG. 6. FIG. 6 is a cut-away side view of the input device 150 of the first embodiment. In FIG. 6, similarly to FIG. 5, it is assumed that the liquid crystal panel 10a is used as the display panel 10, the acrylic plate 20a is used as the input plate 20, the infrared-emitting diodes 30a are used as the infrared-emitting units 30, and the infrared camera 61 is used as the infrared detection unit 60.

The input device 150 of FIG. 6 includes the liquid crystal panel 10a, a diffusion film 14, the acrylic plate 20a, a protection film 21, the infrared-emitting diodes 30a, infrared-emitting-diode drive boards 31, the glass support plate 40, polarizing plates 50, the infrared camera 61, the backlight 70, a spacer 80, a reflecting plate 90, and a casing 100. The infrared camera 61 includes a lens 62, a filter 63, and a solid-state image sensor 64. The backlight 70 includes a chassis 71, fluorescent tubes 72, a reflecting plate 73, a diffusion plate 74, a diffusion film 75, and a frame 76.

Since the liquid crystal panel 10a, the acrylic plate 20a, and the infrared-emitting diodes 30a are described above with reference to FIGS. 1 through 5, their descriptions are omitted here.

Similarly to the above described configuration, the acrylic plate 20a is also disposed above the liquid crystal panel 10a in FIG. 6. The configuration of FIG. 6 is different from the above described configuration in that the protection film 21 is provided on the front surface of the acrylic plate 20a.

Since the acrylic plate 20a is composed of a soft material and is easily scratched, it is preferable to cover the front surface of the acrylic plate 20a with the protection film 21 as illustrated in FIG. 6. Any transparent material with a sufficient strength to protect the acrylic plate 20a may be used for the protection film 21. For example, a hard carbon film called a diamond-like carbon may be used for the protection film 21. As another example, Teflon (registered trademark; a type of fluoroplastic, i.e., polytetrafluoroethylene) may be used for the protection film 21.

When the protection film 21 is provided, the acrylic plate 20a is not directly touched with the fingers 190 in an input operation. Even when the acrylic plate 20a is touched via the protection film 21, the infrared light 35 in the acrylic plate 20a is diffused in substantially the same manner as in the case where the acrylic plate 20a is directly touched, and therefore an input operation can be accurately detected. Although the acrylic plate 20a is used as the input plate 20 in FIG. 6, the protection film 21 may also be provided even when a different material such as crystal glass is used for the input plate 20.

Instead of a translucent material or a transparent material that diffuses light, a transparent material that does not diffuse light is preferably used for the protection film 21. If a material that diffuses light is used as the protection panel 21, since the acrylic plate 20a with a certain thickness (e.g., 5 mm or greater) is present between the liquid crystal panel 10a for displaying images and the protection film 21, adjacent pixels of the liquid crystal panel 10a may be mixed and the displayed images may be blurred.

The protection film 21 may include a function to increase adhesion between the fingers 190 and the acrylic plate 20a in an input operation. For example, when the fingers 190 of the operator are dry, the adhesion between the fingers 190 and the acrylic plate 20a may be reduced and the response to input operations may be degraded. Therefore, the protection film 21 may be made of a film having a certain degree of flexibility or a hydrophilic property to maintain the response to input operations. For example, the protection film 21 may be formed by applying oil or gel on the surface of the acrylic plate 20a. Diamond-like carbon described above has a property similar to oil. Therefore, diamond-like carbon may also be used for the protection film 21 to increase the adhesion between the fingers 190 and the acrylic plate 20a.

In addition to the function to increase adhesion between the fingers 190 and the acrylic plate 20a, the protection film 21 may include a function to facilitate the sliding movement of the fingers 190 on the acrylic plate 20a. This function enables the operator to easily slide the fingers 190 on the acrylic plate 20a and makes it easier to perform input operations.

Similarly to FIG. 5, the polarizing plate 51 that transmits polarized light components in predetermined directions is provided between the front surface of the liquid crystal panel 10a and the back surface of the acrylic plate 20a.

The diffusion film 14 is provided on the back surface of the liquid crystal panel 10a. The diffusion film 14 is a translucent sheet that diffuses or scatters light and is used to make the brightness of the entire liquid crystal panel 10a uniform. The glass support plate 40 is provided on the back surface of the diffusion film 14 to support the acrylic plate 20a and the liquid crystal panel 10a from the underside.

Thus, various films and/or sheets may be provided above and/or below the liquid crystal panel 10a and the acrylic plate 20a as necessary to enable the liquid crystal panel 10a and the acrylic plate 20a to function properly.

The polarizing film 51 is provided on the front surface of the liquid crystal panel 10a but is not provided on the back surface for the same reason as that described above with reference to FIG. 5.

The infrared-emitting diodes 30a are provided on the side surfaces of the acrylic plate 20. The infrared-emitting-diode drive boards 31 for driving the infrared-emitting diodes 30a may also be provided on the side surfaces of the acrylic plate 20a. In other words, the infrared-emitting diodes 30a mounted on the infrared-emitting-diode drive boards 31 may be disposed on the side surfaces of the acrylic plate 20a. Drive circuits for driving the infrared-emitting diodes 30a are mounted on the infrared-emitting-diode drive boards 31.

Figure 7A:
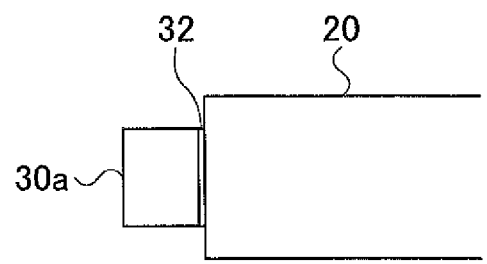
FIG. 7A is a drawing illustrating an infrared-emitting diode attached to an acrylic plate.
Figure 7B:
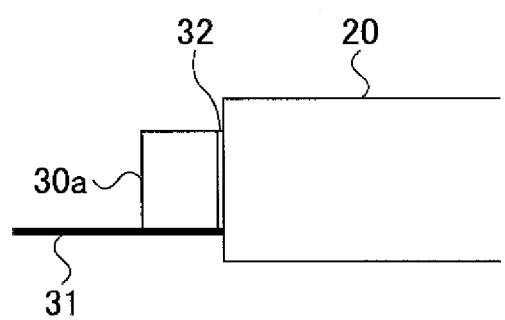
FIG. 7B is a drawing illustrating an infrared-emitting diode mounted on an infrared-emitting diode drive circuit.
Figure 7C:
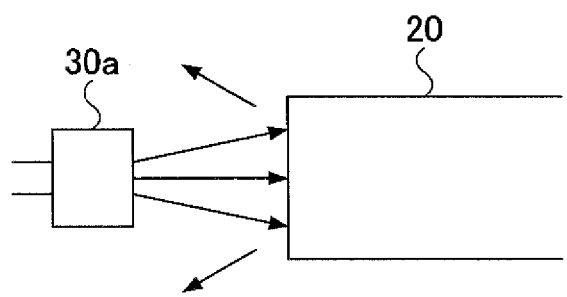
FIG. 7C is a drawing illustrating an infrared-emitting diode that is not in optical contact with an acrylic plate.

FIGS. 7A through 7C are drawings used to describe the positional relationship between the infrared-emitting diode 30a and the acrylic plate 20a. FIG. 7A is a drawing illustrating the infrared-emitting diode 30a that is in optical contact with the acrylic plate 20a. In the example of FIG. 7A, it is assumed that the infrared-emitting diode 30a has a cuboid shape with a flat head. In this case, the head of the infrared-emitting diode 30a may be fixed to the side surface of the acrylic plate 20a with a transparent bond 32. Thus, the infrared-emitting diode 30a is preferably fixed to the side surface of the acrylic plate 20a so that the infrared-emitting diode 30a is in optical contact with the acrylic plate 20a.

FIG. 7B is a drawing illustrating the infrared-emitting diode 30a mounted on the infrared-emitting diode drive board 31. As illustrated in FIG. 7B, even when the infrared-emitting diode 30a is mounted on the infrared-emitting diode drive board 31, it is possible to make the infrared-emitting diode 30a come in optical contact with the acrylic plate 20a by fixing the head of the cuboid-shaped infrared-emitting diode 30a to the side surface of the acrylic plate 20a with the transparent bond 32.

FIG. 7C is a drawing illustrating a comparative example where the infrared-emitting diode 30a is not in optical contact with the acrylic plate 20a. As illustrated in FIG. 7C, if the infrared-emitting diode 30a is disposed apart from the acrylic plate 20a, a part of the infrared light 35 is reflected by the side surface of the acrylic plate 20a and it becomes difficult to efficiently illuminate the inside of the acrylic plate 20a with the infrared light 35. Thus, the infrared-emitting diode 30a is preferably disposed in contact with the side surface of the acrylic plate 20a as illustrated in FIGS. 7A and 7B.

Figure 8:
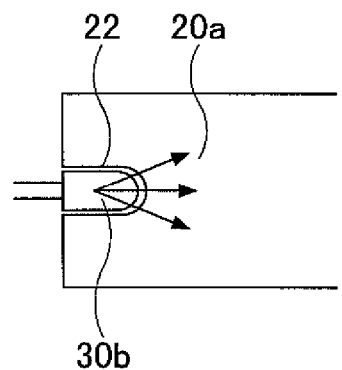
FIG. 8 is a drawing illustrating an infrared-emitting diode with a configuration different from the infrared-emitting diode illustrated in FIGS. 7A through 7C.

FIG. 8 is a drawing illustrating an infrared-emitting diode 30b with a configuration different from the infrared-emitting diode 30a illustrated in FIGS. 7A through 7C. As illustrated in FIG. 8, the infrared-emitting diode 30b has a cylindrical shape with a round head instead of a cuboid-shape with a flat head. Accordingly, it is difficult to bond the infrared-emitting diode 30b to the side surface of the acrylic plate 20a. Instead, the infrared-emitting diode 30b may be placed in optical contact with the acrylic plate 20a by embedding the infrared-emitting diode 30b in a hole 22 formed in the acrylic plate 20a.

Thus, the infrared-emitting diode 30b may be embedded in the side surface of the acrylic plate 20a. Also, the infrared-emitting diode 30a with a cuboid shape illustrated in FIGS. 7A and 7B may also be embedded in the acrylic plate 20a. Further, the outer case of the infrared-emitting diode 30a/30b may be removed and the light-emitting element in the outer case may be embedded in the hole 22 of the acrylic plate 20a.

Thus, the infrared-emitting diode 30a/30b may be attached to the side surface of the acrylic plate 20a in any manner as long as the infrared-emitting diode 30a/30b is in optical contact with the acrylic plate 20a.

Referring back to FIG. 6, the infrared camera 61 and the backlight 70 are disposed at a distance below the glass support plate 40. The infrared camera 61 may be provided inside of the backlight 70.

The infrared camera 61 includes the lens 62, the filter 63, the solid-state image sensor 64, and a camera case 65. The lens 62 receives and focuses the diffused infrared light 35 emitted from the back surface of the acrylic plate 20a. The filter 63 is a noise removing part that transmits only the infrared light 35 and thereby makes it possible to obtain an image based only on the infrared light 35 emitted from the acrylic plate 20a without being affected by, for example, visible light. Any type of infrared-transmitting filter that transmits only the infrared light 35 may be used as the filter 63.

The solid-state image sensor 64 receives light and outputs an electric signal corresponding to the luminance of the light. For example, a charge coupled device (CCD) or a complementary metal oxide semiconductor may be used as the solid-state image sensor 64. The camera case 65 houses the lens 62, the filter 63, and the solid-state image sensor 64.

Thus, with the infrared camera 61, an image is obtained based only on the infrared light 35 received by the solid-state image sensor 64 through the filter 63. This configuration makes it possible to eliminate the influence of light other than the infrared light 35, which is emitted by the backlight 70 or enters from the outside, and thereby makes it possible to reliably obtain an image indicating an input operation on the acrylic plate 20a.

The lens 62 and the filter 63 may be arranged in the reverse order, i.e., the lens 62 may be disposed below the filter 63.

In the example of FIG. 6, only one infrared camera 61 is provided. However, as described later, two or more infrared cameras 61 may be provided.

The backlight 70 includes the chassis 71, the fluorescent tubes 72, the reflecting plate 73, the diffusion plate 74, the diffusion film 75, and the frame 76. The chassis 71 supports the input device 150 including the backlight 70 from the underside. The fluorescent tubes 72 illuminate the back surface of the liquid crystal panel 10a to display the graphical interface on the liquid crystal panel 10a. One or more fluorescent tubes 72 may be provided in the backlight 70. Providing multiple fluorescent tubes 72 in the backlight 70 makes it possible to uniformly illuminate the back surface of the liquid crystal panel 10a. Instead of the fluorescent tubes 72, light-emitting diodes may be used as the light sources of the backlight 70. The reflecting plate 73 reflects downward light from the fluorescent tubes 72 in the upward direction. The backlight 70 in FIG. 6 is configured as a direct-lighting backlight including multiple fluorescent tubes 72. Alternatively, the backlight 70 may be configured as an edge-lighting (or side-lighting) backlight where the fluorescent tubes 72 are disposed at edges. Using an edge-lighting backlight makes it possible to reduce the thickness of the backlight 70.

The diffusion plate 74 reflects the light from the fluorescent tubes 72 forward (toward the liquid crystal panel 10a) and thereby illuminates the liquid crystal panel 10a with a greater amount of visible light. The diffusion film 75, similarly to the diffusion plate 74, diffuses the light from the fluorescent tubes 72. In other words, the diffusion film 75 aids the diffusion plate 74. The polarizing plate 52 transmits only polarized light components in predetermined directions. In the input device 150 of this embodiment, the polarizing plate 52 is disposed at the front side of the backlight 70 instead of on the back surface of the liquid crystal panel 10a. The frame 76 forms the contour of the backlight 70. The frame 76 supports the backlight 70 from the outside and makes it possible to place other components such as the liquid crystal panel 10a above the backlight 70.

An opening 77 is formed through the diffusion plate 74, the diffusion film 75, and the polarizing plate 52 of the backlight 70. The infrared camera 61 is disposed at a position corresponding to the opening 77. With this configuration, the diffusion plate 74, the diffusion film 75, and the polarizing plate 52 influence only the light emitted from the backlight 70 to illuminate the back surface of the liquid crystal panel 10a, but do not influence the infrared light 35 received by the infrared camera 61. In other words, this configuration enables the infrared camera 61 to receive the diffused infrared light 35, which is emitted from the acrylic plate 20a as a result of an input operation with, for example, the fingers 190 and passes through the crystal panel 10a and the glass support plate 40, without being influenced by the components of the backlight 70. Meanwhile, the fluorescent tubes 72 are placed in positions where the infrared camera 61 is not present so that the light from the fluorescent tubes 72 is not blocked by the infrared camera 61.

Thus, forming the opening 77 through the diffusion plate 74, the diffusion film 75, and the polarizing plate 72 of the backlight 70 and placing the infrared camera 61 in a position corresponding to the opening 77 make it possible to reliably detect input operations. Also, placing the fluorescent tubes 72 in positions where the infrared camera 61 is not present makes it possible to reliably illuminate the liquid crystal panel 10a.

Figure 9A:
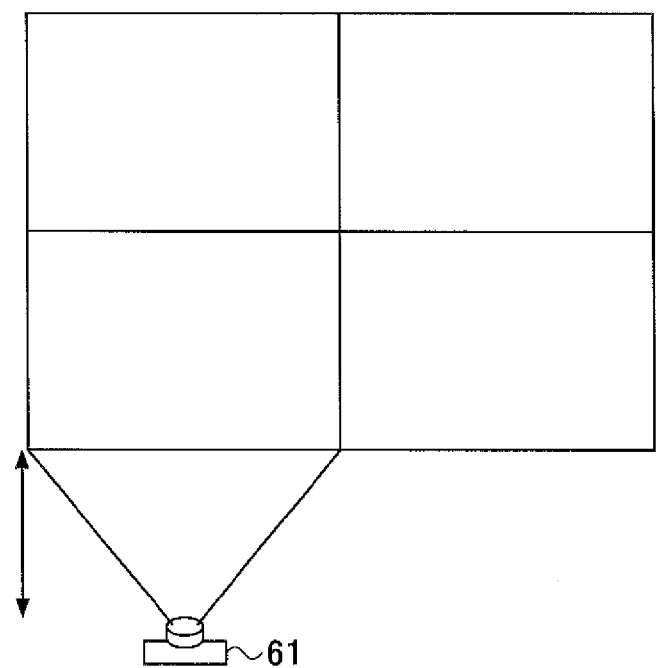
FIG. 9A is a drawing illustrating a case where four infrared cameras are provided in an input device of the first embodiment.

Next, the relationship between the number of the infrared cameras 61 and the distance from the infrared cameras 61 to the acrylic plate 20a is described with reference to FIGS. 9A and 9B. FIGS. 9A and 93 are drawings used to describe the positional relationship between the infrared cameras 61 and the acrylic plate 20a.

FIG. 9A illustrates a case where four infrared cameras 61 are provided in total. As illustrated in FIG. 9A, when four infrared cameras 61 are provided, it is necessary to obtain an image of one fourth of the total area of the acrylic plate 20a with each of the infrared cameras 61. In this case, it is necessary to set the distance between the infrared cameras 61 and the acrylic plate 20a such that each of the infrared cameras 61 can obtain an image of the one-fourth area.

Figure 9B:
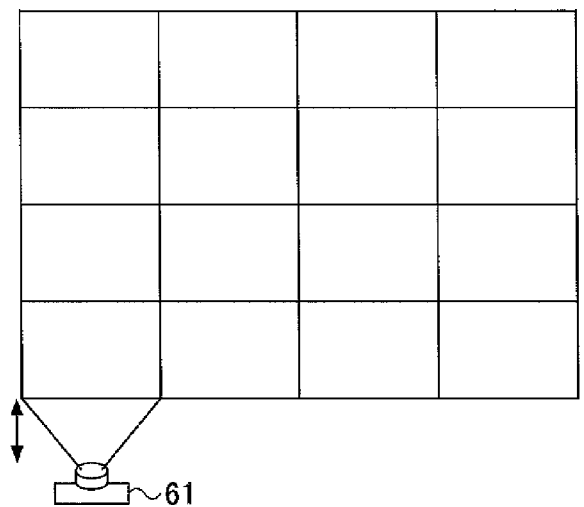
FIG. 9B is a drawing illustrating a case where 16 infrared cameras are provided in an input device of the first embodiment.

FIG. 9B illustrates a case where 16 infrared cameras 61 are provided in total. As illustrated in FIG. 9B, when 16 infrared cameras 61 are provided, each of the infrared cameras 61 needs to obtain an image of only one sixteenth of the total area of the acrylic plate 20a. In this case, since the imaging area of each of the infrared cameras 61 is reduced, the distance between the infrared cameras 61 and the acrylic plate 20a can be reduced compared with the case illustrated in FIG. 9A. This in turn makes it possible to reduce the thickness of the input device 150.

Thus, increasing the number of the infrared cameras 61 makes it possible to reduce the distance between the infrared cameras 61 and the acrylic plate 20a and thereby makes it possible to reduce the thickness of the input device 150. Accordingly, the number of the infrared cameras 61 may be determined appropriately according to the intended usage of the input device 150.

Although multiple infrared cameras 61 are used in the exemplary cases of FIGS. 9A and 93, only one infrared camera 61 may be provided as illustrated in FIG. 6 when it is sufficient to cover the entire area of the acrylic plate 20a.

Referring to FIG. 6, the spacer 80 supports upper components such as the liquid crystal panel 10a. As described with reference to FIGS. 9A and 93, it is necessary to maintain an appropriate distance between the acrylic plate 20a and the infrared camera 61. The spacer 80 supports upper components including the liquid crystal panel 10a and also maintains the distance between the infrared camera 61 and the acrylic plate 20a.

The reflecting plate 90 reflects outgoing light, both visible light and infrared light, inward to improve signal efficiency.

The casing 100 defines the lateral contour of the input device 150, and supports and holds the upper and lower components including the liquid crystal panel 10a and the backlight 70.

As described above, with the input device 150 of the first embodiment, it is possible to properly display the graphical interface on the liquid crystal panel 10a as well as to accurately detect multi-touch input operations on the graphical interface.

Variations of the input device 150 of the first embodiment are described below with reference to FIGS. 10 and 11.

Figure 10:
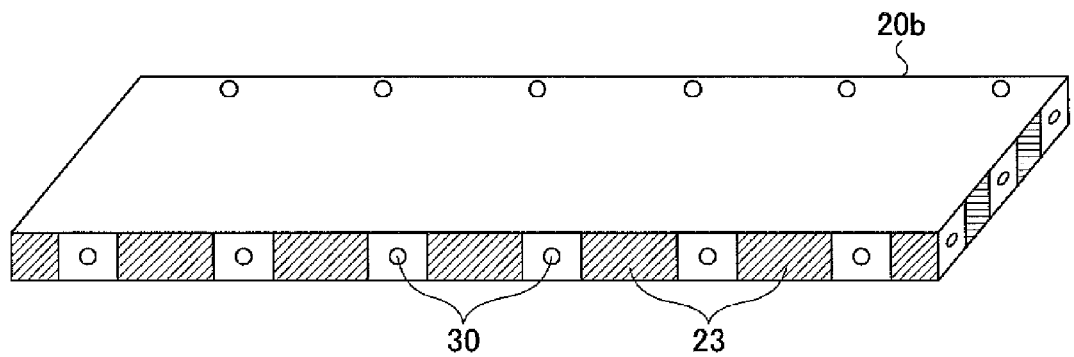
FIG. 10 is a drawing illustrating a variation of an input plate of an input device of the first embodiment.

FIG. 10 is a drawing illustrating an input plate 20b that is a variation of the input plate 20 of the first embodiment. Similarly to the above embodiment, the infrared-emitting units 30 are provided on the side surfaces of the input plate 20b. The input plate 20b of FIG. 10 is different from the input plate 20 of the above embodiment in that mirrors 23 are provided on the side surfaces of the input plate 20b at positions where the infrared-emitting units 30 are not present. The reflecting surfaces of the mirrors 23 face the inside of the input plate 20b. Thus, the input device 150 may further include the mirrors 23 having the reflecting surfaces facing inward and disposed at positions where the infrared-emitting units 30 are not present. The mirrors 23 make it possible to efficiently fill the inside of the input plate 20b with the infrared light 35 and to receive the diffused infrared light 35 at a high S/N ratio.

The variation illustrated in FIG. 10 may also be applied to a case where the input plate 20b is implemented by a component other than the acrylic plate 20a. Further, the display panel 10 and the infrared-emitting units 30 may be implemented by components other than the liquid crystal panel 10a and the infrared-emitting diodes 30a.

Figure 11:
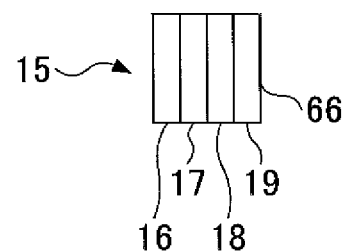
FIG. 11 is a drawing illustrating an example where infrared detection units are provided on a display panel.

FIG. 11 is a drawing illustrating another variation where the infrared detection unit 60 is provided for each of pixels 15 of the display panel 10. In the above embodiment, the infrared detection unit 60 is implemented by the infrared camera 61 that is disposed below the display panel 10. According to a variation, the infrared detection unit 60 may be provided in a cell of each of the pixels 15 of the display panel 10. In FIG. 11, each of the pixels 15 includes a fourth cell 19 in addition to a red-display cell 16, a green-display cell 17, and a blue-display cell 18. For example, an infrared sensor 66 may be provided in the fourth cell 19 to detect the infrared light 35 for each of the pixels 15 of the display panel and thereby to detect an input operation. The infrared sensor 66 may not necessarily include an imaging unit as long as it can detect the intensity of the infrared light 35. Providing the infrared sensor 66 in each of the pixels 15 makes it possible to accurately detect an input operation at the pixel level. This configuration also eliminates the need to provide an infrared imaging unit below the display panel 10 and thereby makes it possible to reduce the thickness of the input device 150.

Instead of providing the fourth cell 19 for each pixel of the display panel 10, the fourth cell 19 may be provided, for example, every 5 pixels or 10 pixels. Further, instead of providing the infrared detection unit 60 as the fourth cell 19 separate from the first through third cells, the infrared detection unit 60 may be provided in one of the first through third cells. For example, when a liquid crystal panel is used as the display panel 10, the infrared detection unit 60 may be provided as a layer of a switching element (e.g., a thin-film transistor) provided for each cell. With this configuration, the infrared detection unit 60 does not block light passing through the display panel 10. Accordingly, this configuration makes it possible to improve the brightness of the display panel 10.

Thus, the infrared detection unit 60 may be implemented by the infrared sensor 66 provided for each of the pixels 15 of the display panel 10. This variation may also be applied to a case where the display panel 10 is implemented by a component other than the liquid crystal panel 10a.

Figure 12:
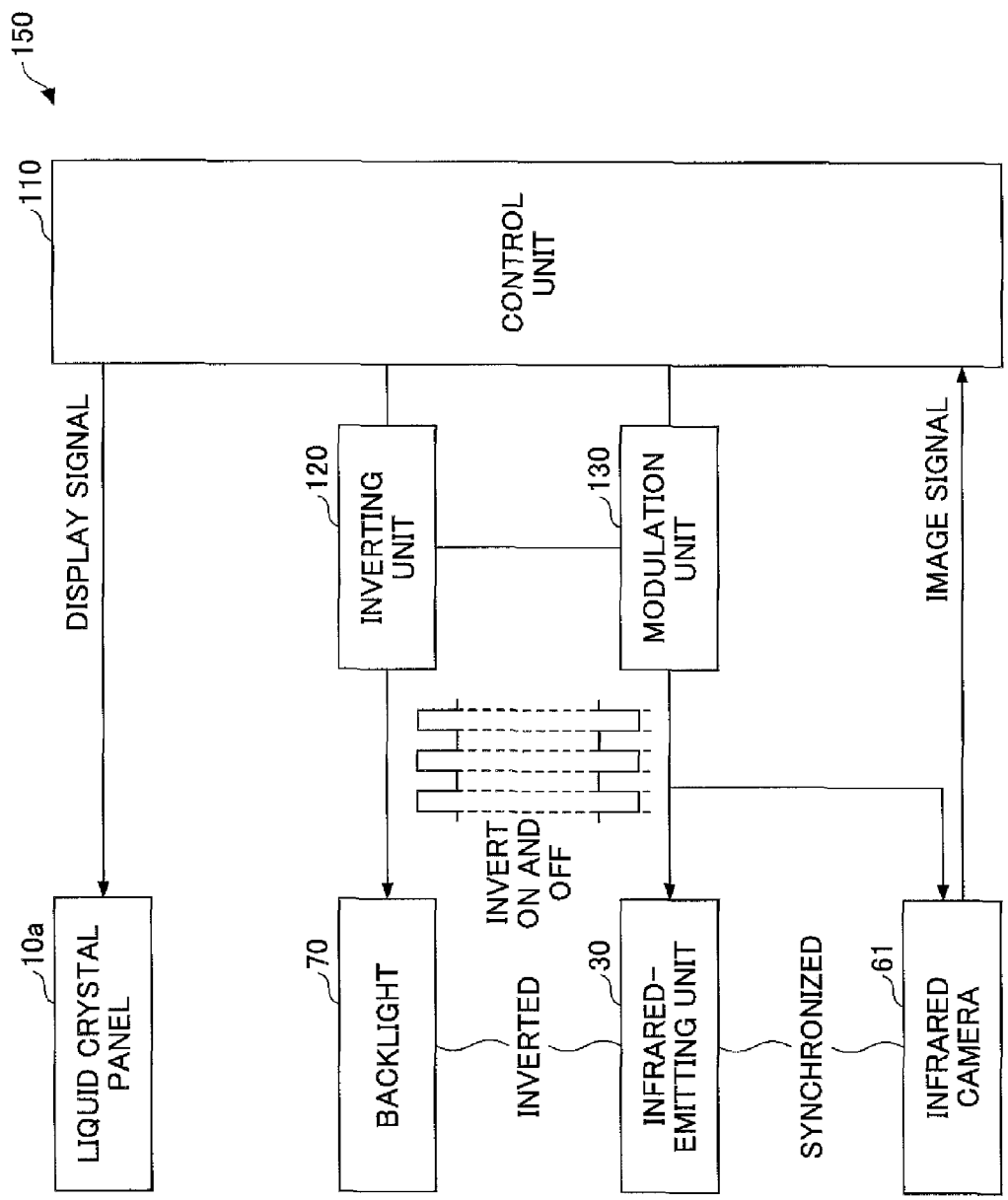
FIG. 12 is a drawing illustrating an exemplary system configuration of an input device of the first embodiment.

FIG. 12 is a drawing illustrating an exemplary system configuration of the input device 150 of the first embodiment. In FIG. 12, it is assumed that the liquid crystal panel 10a is used as the display panel 10. As illustrated in FIG. 12, the input device 150 of the first embodiment includes the liquid crystal panel 10a, the backlight 70, the infrared-emitting unit (s) 30, the infrared camera 61, a control unit 110, an inverting unit 120, and a modulation unit 130. The liquid panel 10a, the liquid crystal panel 10a, the backlight 70, the infrared-emitting unit 30, and the infrared camera 61 have the configurations and functions as described above, and therefore their descriptions are omitted here.

The control unit 110 controls the entire input device 150. The control unit 110 outputs a display signal to the liquid crystal panel 10a, synchronizes operations of the infrared-emitting unit 30 and the infrared camera 61, obtains an image from the infrared camera 61, processes the obtained image, and determines whether an input operation has been performed. For example, the control unit 110 may be implemented by an application specific integrated circuit (ASIC) including electronic circuits or an arithmetic processing unit such as a microcomputer that operates according to software.

The modulation unit 130 converts a voltage supplied to the infrared-emitting unit 30 into a pulse signal that turns on and off at predetermined intervals. The modulation unit 130 performs modulation in synchronization with an input signal from the control unit 110. An output signal from the modulation unit 130 is output to the infrared-emitting unit 30 and the infrared camera 61. Accordingly, the timing of emitting infrared light from the infrared-emitting unit 30 and the timing of obtaining an image by the infrared camera 61 are synchronized.

The inverting unit 120 inverts a drive signal from the control unit 110 and supplies the inverted drive signal to the modulation unit 130. For example, when a pulse signal that turns on and off at predetermined intervals is input from the control unit 110, the inverting unit 120 inverts the "ONs" and "OFFs" of the pulse signal and outputs the inverted pulse signal to the modulation unit 130. The inverting unit 120 may be implemented, for example, by an inverter composed of a CMOS device. The drive signal that is not inverted by the inverting unit 120 is output to the backlight 70.

Since the ON-OFF timing of the drive signal output from the modulation unit 130 is opposite to the ON-OFF timing of the drive signal output to the backlight 70, the infrared-emitting unit 30 and the infrared camera 61 are driven at timing different from the timing when the backlight 70 is driven.

Thus, using the inverting unit 120 and the modulation unit 130 makes it possible supply opposite drive signals to the backlight 70 and to the infrared-emitting unit 30 and the infrared camera 61. Accordingly, when the backlight 70 is turned on, the infrared-emitting unit 30 and the infrared camera 61 are turned off; and when the backlight 70 is turned off, the infrared-emitting unit 30 and the infrared camera 61 are turned on.

The backlight 70 is turned on to illuminate the liquid crystal panel 10a and display the graphical interface, and the infrared-emitting unit 30 and the infrared camera 61 are turned on to detect only the infrared light and thereby detect an input operation. Driving the backlight 70 at timing different from the timing when the infrared-emitting unit 30 and the infrared camera 61 are driven makes it possible to prevent the light emitted by the backlight 70 from being received by the infrared camera 61 and to accurately detect an input operation. Particularly, when the fluorescent tubes 72 that emit infrared light in addition to visible light are used for the backlight 70, performing timing control as described above makes it possible to reliably detect only the infrared light 35 and thereby makes it possible to accurately detect an input operation. Also, the above configuration makes it possible to reduce the influence of disturbance light that is external light entering from the front side of the liquid crystal panel 10a in addition to the influence of infrared light from the backlight 70. This in turn makes it possible to use the input device 150 in a light-filled environment.

The ON-OFF timing may be determined to match the frame frequency of the graphical interface displayed on the display panel 10. Also, the duty ratio of ON and OFF may be set at any appropriate value. For example, the duty ratio may be determined such that the period of time for which the backlight 70 is turned on becomes longer than the period of time for which the infrared-emitting unit 30 is turned on.

The image obtained by the infrared camera 61 is output to the control unit 110, and the control unit 110 determines whether an input operation has been performed based on the image and detects a user input based on the determination result.

As another example, the control unit 110 may be configured to continuously turn on the backlight 70 and the infrared camera 61 and to turn on and off only the infrared-emitting unit 30. In this case, an input operation is detected based on a difference between an image obtained by the infrared camera 61 when the infrared-emitting unit 30 is ON and an image obtained by the infrared camera 61 when the infrared-emitting unit 30 is OFF is determined. This configuration makes it possible to remove the influence of disturbance light (e.g., infrared light from the backlight 70) detected when the infrared-emitting unit 30 is OFF and thereby makes it possible to detect only the infrared light from the infrared-emitting unit 30, i.e., to improve input detection accuracy.

Further, the infrared-emitting unit 30 may be driven using pulses. Driving the infrared-emitting unit 30 using pulses makes it possible to supply a high electric current by concentrating the electric current at the drive timing and thereby makes it possible to increase the luminance of the infrared-emitting unit 30. This configuration also makes it possible to decrease light-receiving time to match the pulse width. Decreasing the light-receiving time makes it possible to reduce the amount of disturbance light such as light entering from the upper side of the input plate 20 and surrounding light (e.g., sunlight or light from an indoor fluorescent lamp). This in turn makes it possible to increase the S/N ratio and to accurately detect input positions.

When multiple infrared cameras 61 are provided as described above with reference to FIGS. 9A and 9B, it is necessary to calibrate the infrared cameras 61. An exemplary method of calibrating the infrared cameras 61 is described below with reference to FIGS. 13A through 13D. FIGS. 13A through 13D are drawings used to describe a method of calibrating the infrared cameras 61 of the input device 150 of the first embodiment.

Figure 13A:
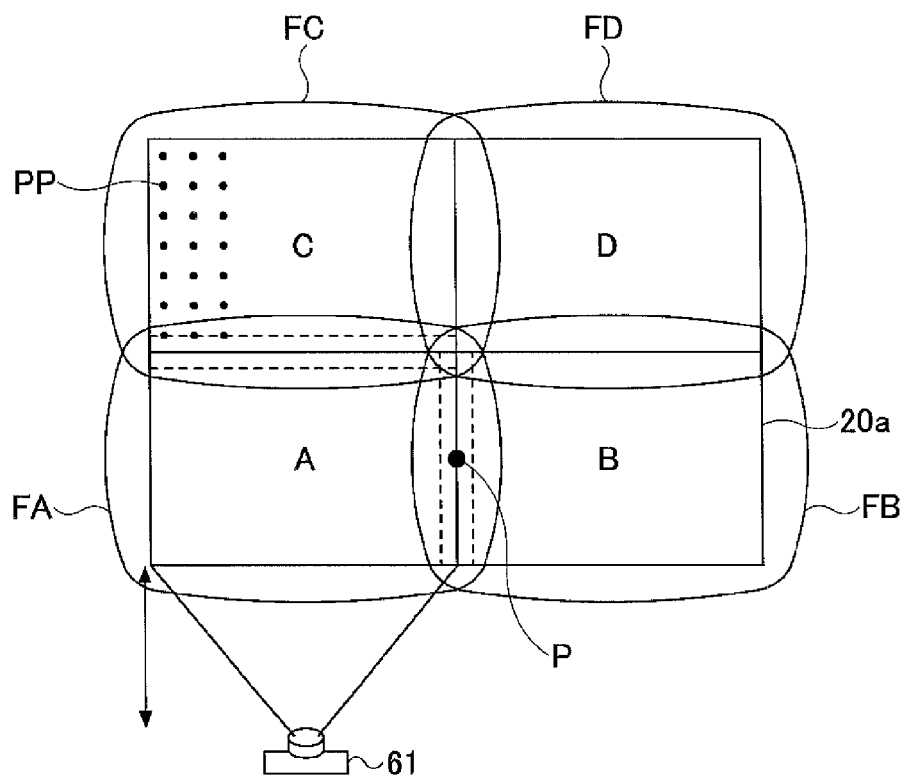
FIG. 13A is a drawing illustrating an exemplary relationship between an acrylic plate and the fields of view of infrared cameras.

FIG. 13A is a drawing illustrating an exemplary relationship between the acrylic plate 20a and the fields of view of the infrared cameras 61. In FIG. 13A, the acrylic plate 20a is divided into four sub-areas A through D. The infrared camera 61 is provided for each of the sub-areas A through D and four infrared cameras 61 are provided in total. In FIG. 13, only the infrared camera 61 for the sub-area A is illustrated and the infrared cameras 61 for the sub-areas B through D are omitted for brevity. The infrared cameras 61 have fields of view (imaging areas) FA through FD corresponding to the sub-areas A through D, respectively. The fields of view FA through FD cover imaging ranges that include the respective sub-areas A through D on the acrylic plate 20a. Boundary areas between adjacent pairs of the sub-areas A through D are covered by corresponding pairs of the fields of view FA through FD. A point P on the boundary line between the sub-area A and the sub-area B is also shown in FIG. 13A.

Figure 13B:
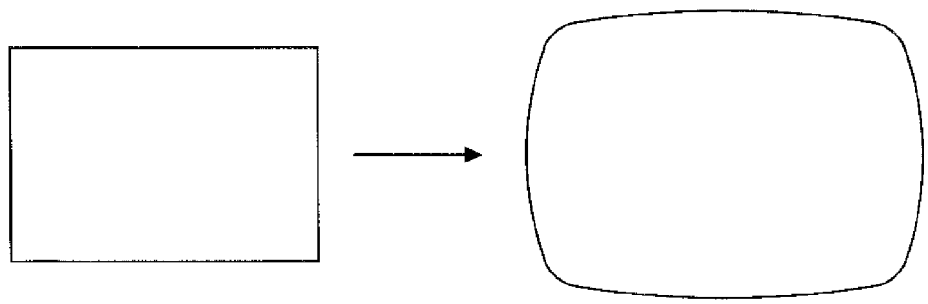
FIG. 13B is a drawing illustrating distortion of a lens of an infrared camera.

FIG. 13B is a drawing illustrating distortion of the lens 62 of the infrared camera 61. When multiple infrared cameras 61 are provided as described above with reference to FIGS. 9A and 9B and a wide-angle lens is used as the lens 62, the wide-angle lens cause distortion at edges of each of the fields of view FA through FD. FIG. 13B illustrates the distortion at the edges of a field of view. Assuming that each of the sub-areas A through D has a rectangular shape as illustrated in the left side of FIG. 13B, an image of the sub-area obtained by the infrared camera 61 with a wide-angle lens 62 is distorted as illustrated in the right side of FIG. 13B. Particularly, the edges of the sub-area are severely distorted by the lens 62, and the positions and shapes of the edges in an obtained image may become different from the actual positions and shapes.

Figure 13C:
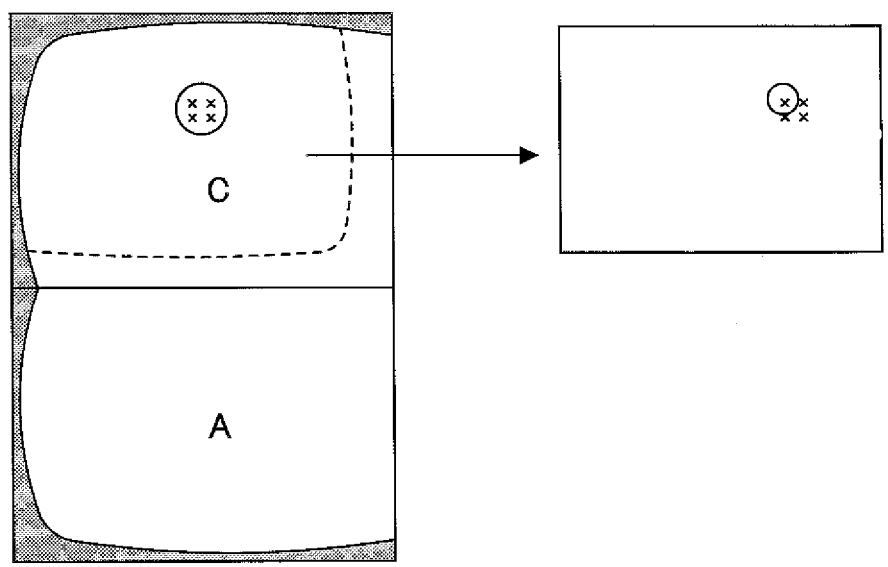
FIG. 13C is a drawing used to describe a method of correcting distortion of an image caused by a lens.

FIG. 13C is a drawing used to describe a method of correcting distortion of an image caused by the lens 62. The sub-areas A and C of the acrylic plate 20a are illustrated in FIG. 13C. An image of the sub-area C that is distorted by the lens 62 is indicated by a dotted line. In this case, it is necessary to calibrate the infrared camera 61 to correct the distortion. More specifically, it is necessary to calibrate the infrared camera 61 such that the distorted image of the sub-area C indicated by the dotted line is corrected to a rectangular image as illustrated in the right side of FIG. 13C.

Figure 13D:
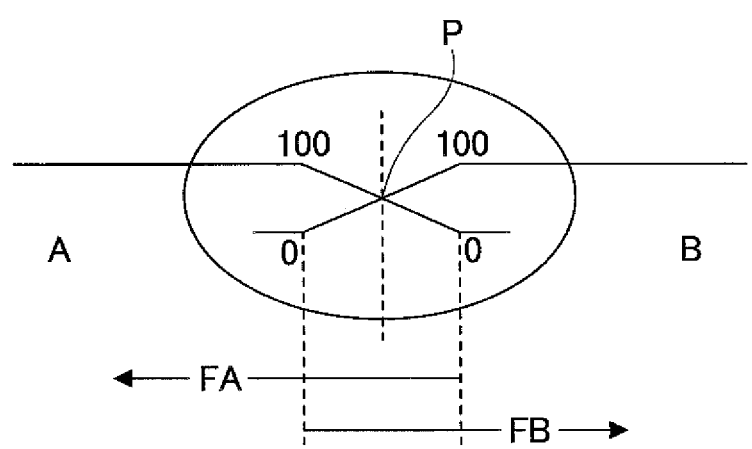
FIG. 13D is a drawing illustrating strength of image signals in a boundary area.

FIG. 13D illustrates the strength of image signals obtained by the infrared cameras 61 in the boundary area between the sub-area A and the sub-area B. The infrared cameras 61 can obtain image signals with a uniform and sufficient strength in central areas of the fields of view FA through FD. However, the strength of image signals obtained in peripheral areas of the fields of view FA through FD becomes less than the strength of the image signals obtained in the central areas. As illustrated in FIG. 13D, the strength of the image signal in the field of view FA decreases from 100% as it becomes closer to the sub-area B (right side). Similarly, the strength of the image signal in the field of view FB decreases from 100% as it becomes closer to the sub-area A (left side). In FIG. 13D, P indicates a point on the boundary line between the sub-areas A and B, i.e., in an overlapping area between the field of view FA and the field of view FB. As illustrated in FIG. 13D, to obtain a correct image of the entire acrylic plate 20a, it is necessary to perform calibration such that the infrared camera 61 for the sub-area A and the infrared camera 61 for the sub-area B can obtain images of the point P on the boundary line between the sub-areas A and B is a similar manner. More specifically, it is necessary to perform calibration such that the infrared cameras 61 for the sub-areas A and B can detect the point P at the same position and with the same signal strength.

Referring to FIG. 13A again, multiple points PP are illustrated in the sub-area C. In an exemplary calibration method, points (coordinates) used for calibration are defined beforehand as the points PP. Marks are displayed at the positions of the points PP, the user touches the marks with the finger 190, and images of the finger 190 are obtained by the infrared camera 61. Here, it is assumed that the coordinates of the points PP are known to the control unit 110 of the input device 150. Therefore, the control unit 110 compares the images of the finger 190 touching the acrylic plate 20a with the actual coordinates of the points PP. Then, the infrared camera 61 is calibrated such that the images of the finger 190 match the corresponding points PP known to the control unit 110 to correct the distortion of the lens 62. This process is performed at two or more of the points PP in each of the sub-areas A through D to calibrate the infrared cameras 61 for the sub-areas A through D.

Thus, in a case where multiple infrared cameras 61 are provided for the input plate 20 and each of the infrared cameras 61 obtains an image of one of sub-areas of the input plate 20, a method of calibrating the infrared camera 61 of the first embodiment includes the steps of displaying a mark, by the display panel 10, at a position corresponding to a predetermined position on the input plate 20 which is known to the control unit 110; obtaining, by the infrared camera 61, an input operation image of an input operation point at which the displayed mark is touched via the input plate 20; and calibrating the infrared camera 61 such that the input operation point indicated by the input operation image matches the predetermined position of the mark. The above steps may be performed at multiple points to calibrate each infrared camera 61. Also, the above steps may be performed for each of the sub-areas. Further, the above steps may be performed at points including a point on a boundary line between adjacent sub-areas. Calibrating the infrared cameras 61 as described above makes it possible to accurately detect input operations in all sub-areas of the input plate 20.

Thus, when the input device 150 includes multiple infrared cameras 61, a calibration mark is displayed at a predetermined point on the liquid display panel 10a which is known to the control unit 110, the mark is touched by the finger 190, an image of the finger 190 touching the mark is obtained, and the difference between the obtained image and the coordinates of the known point is detected to calibrate each of the infrared cameras 61. Marks may be displayed at multiple points and calibration may be performed at each of the points to improve the accuracy of the calibration.

FIG. 14 is a drawing illustrating a table interface 170 including the input device 150 of the first embodiment. As illustrated in FIG. 14, the display panel 10 is provided on a surface of a table 171 to display a graphical interface. An operator touches the graphical interface with the finger(s) 190 or a pen 191 to perform an input operation. Then, the input device 150 detects the input operation and performs processing corresponding to the input operation. Even when multiple input points are touched, the input device 150 can detect all the input points. Also, the input device 150 detects input operations through image processing on the entire display panel 10 without performing complex calculations and therefore makes it possible to perform input operations on a large screen. For example, it is difficult to apply an input detection device using capacitance to a large screen because a capacitance change resulting from an input operation on such a large screen is very small.

Thus, the input device 150 of the first embodiment makes it possible to detect a multi-touch input operation on a large screen and may have various applications. For example, a graphical interface simulating a piano keyboard or a game board such as a roulette board may be displayed on the display panel 10 to receive multi-touch operations. Further, the input device 150 of the first embodiment may be applied to small screens of, for example, mobile terminals in addition to large screens.

Second Embodiment

Figure 15:
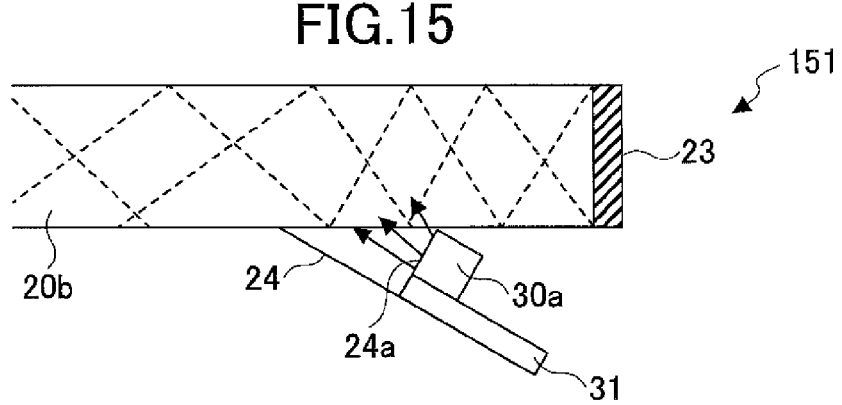
FIG. 15 is a drawing illustrating a cross section of an input device according to a second embodiment.

FIG. 15 is a drawing illustrating a cross section of an acrylic plate 20b of an input device 151 according to a second embodiment. The input device 151 of the second embodiment is different from the input device 150 of the first embodiment in that the infrared-emitting diode 30a is provided on the back surface of the acrylic plate 20b instead of on the side surface. Other components of the input device 151 are substantially the same as those of the input device 150 of the first embodiment and therefore their descriptions are omitted here.

As illustrated in FIG. 15, the acrylic plate 20b includes a protrusion(s) 24 protruding obliquely downward from the back surface. The protrusion 24 has a flat protrusion surface 24a. The infrared-emitting diode 30a is in contact with and fixed to the protrusion surface 24a. The infrared-emitting diode 30a is also mounted on an infrared-emitting-diode drive board 31 that protrudes obliquely downward from the protrusion surface 24a. The bottom surface of the infrared-emitting-diode drive board 31 substantially matches an extension line of the bottom surface of the protrusion 24.

Thus, the acrylic plate 20b may have the protrusion 24 having the flat protrusion surface 24a and the infrared-emitting diode 30a may be fixed to the protrusion surface 24a such that infrared light enters from the back surface of the acrylic plate 20b. In other words, the infrared-emitting diode 30a is fixed to the acrylic plate 20b with the protrusion surface 24a as a contact surface such that the infrared light enters the acrylic plate 20b from the contact surface. With this configuration, the infrared-emitting-diode drive board 31 does not protrude from the side surface of the input device 151 and makes it possible to easily carry the input device 151.

The acrylic plate 20b of the input device 151 of the second embodiment may be produced, for example, by bonding the protrusion 24 to a flat acrylic plate. Thus, the acrylic plate 20b can be produced through a simple process.

Also with the input device 151 of the second embodiment, since the infrared-emitting diodes 30a are not provided on the side surfaces of the acrylic plate 20b, it is possible to cover the entire side surfaces of the acrylic plate 20b with the mirrors 23. This configuration makes it possible to reduce the leakage of infrared light propagating through the acrylic plate 20b and increase the amount of infrared light in the acrylic plate 20b, and thereby makes it possible to more accurately detect input operations.

Third Embodiment

Figure 16:
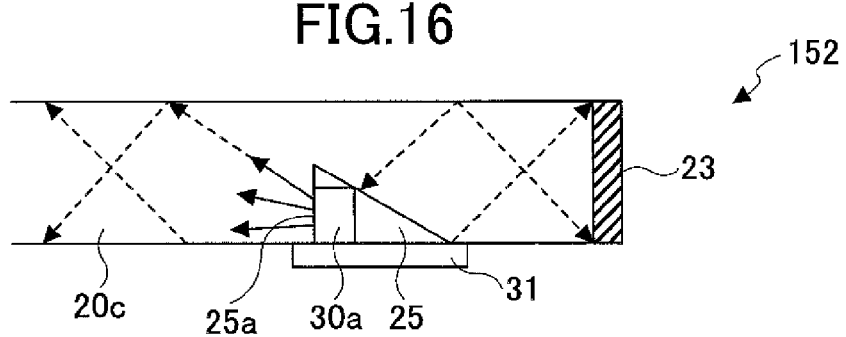
FIG. 16 is a drawing illustrating a cross section of an input device according to a third embodiment.

FIG. 16 is a drawing illustrating a cross section of an acrylic plate 20c of an input device 152 according to a third embodiment. The input device 152 of the third embodiment is different from the input devices 150 and 151 of the first and second embodiments in that the infrared-emitting diode 30a is provided in a recess 25 formed in the back surface of the acrylic plate 20c. Other components of the input device 152 are substantially the same as those in the first and second embodiments and therefore their descriptions are omitted here.

As illustrated in FIG. 16, the recess 25 having a triangular cross section is formed in the back surface of the acrylic plate 20c. The triangular recess 25 has a recessed surface 25a extending inward and the infrared diode 30a is in contact with and fixed to the recessed surface 25a. In other words, the infrared-emitting diode 30a is fixed to the acrylic plate 20c with the recessed surface 25a as a contact surface such that the infrared light enters the acrylic plate 20c from the contact surface. The infrared-emitting diode 30a is also mounted on the infrared-emitting-diode drive board 31. The length in the horizontal direction of the recess 25 is less than the length of the infrared-emitting-diode drive board 31. With this configuration, the recess 25 is covered by the infrared-emitting-diode drive board 31 and the infrared-emitting diode 30a is sealed in the recess 25.

Although the recessed surface 25a is perpendicular to the back surface of the acrylic plate 20c in FIG. 16, the angle of the recessed surface 25a with respect to the back surface of the acrylic plate 20c may be determined freely according to the purpose. Still, however, with the recessed surface 25a that is perpendicular to the back surface of the acrylic plate 20, it is possible to horizontally mount the infrared-emitting diode 30a on the infrared-emitting-diode drive board 31 and to cover the recess 25 with the infrared-emitting-diode drive board 31 by just placing the infrared-emitting diode 30a in the recess 25. Thus, this configuration makes it possible to simplify the production process. Accordingly, it is preferable to form the recessed surface 25a to become perpendicular to the back surface of the acrylic plate 20c as illustrated in FIG. 16.

The recesses 25 may be formed separately at positions where the infrared-emitting diodes 30a are placed, or may be formed as continuous grooves in the back surface of the acrylic plate 20c. That is, the recesses 25 may be formed in any appropriate manner as long as a desired number of infrared-emitting diodes 30a can be provided at appropriate positions.

With the configuration of the third embodiment, like the input device 151 of the second embodiment, it is possible to cover the entire side surfaces of the acrylic plate 20c with the mirrors 23.

With the configuration of the input device 152 of the third embodiment, it is not necessary to provide the protrusion 24 on the back surface of the acrylic plate 20c. This in turn makes it possible to make the acrylic plate 20c substantially flat and thereby makes it possible to reduce the thickness of the input device 152. Also, similarly to the input device 151 of the second embodiment, the infrared-emitting-diode drive board 31 does not protrude outward from the side surface of the acrylic plate 20c. Thus, the configuration of the third embodiment also makes it possible to easily handle and carry the input device 152.

Fourth Embodiment

Figure 17:
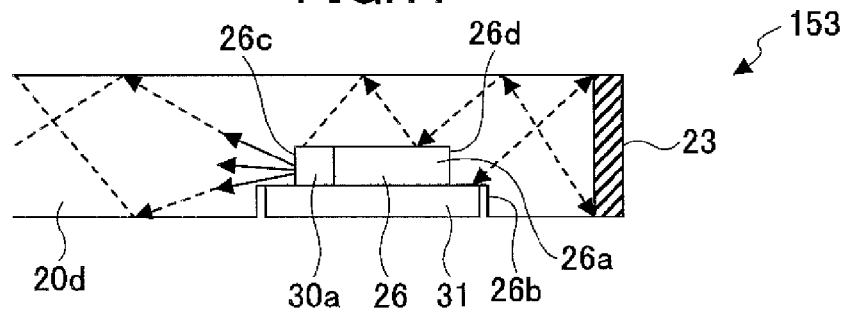
FIG. 17 is a drawing illustrating a cross section of an input device according to a fourth embodiment.

FIG. 17 is a drawing illustrating a cross section of an acrylic plate 20d of an input device 153 according to a fourth embodiment. The input device 153 of the fourth embodiment is similar to the input device 152 of the third embodiment in that a recess 26 is formed in the back surface of the acrylic plate 20d and the infrared-emitting diode 30a is provided in the recess 26. However, the recess 26 has a shape that is different from the recess 25 of the input device 152 of the third embodiment. Other components of the input device 153 are substantially the same as those of the input devices 150 through 152 of the first through third embodiments and therefore their descriptions are omitted here.

As illustrated in FIG. 17, the recess 26 is formed in the back surface of the acrylic plate 20d of the input device 153 of the fourth embodiment. The recess 26 has a cross section shaped like a combination of two rectangles with different depths. More specifically, the recess 26 is composed of a deep recess 26a and a shallow recess 26b. The deep recess 26a houses the infrared-emitting diode 30a, and the shallow recess 26b houses and holds the infrared-emitting-diode drive board 31. The width of the opening of the shallow recess 26b is greater than the width of the opening of the deep recess 26a. In a plan view, the shallow recess 26b encompasses the deep recess 26a.

The deep recess 26a has an inner recessed surface 26c facing the inside of the acrylic plate 20d and an outer recessed surface 26d facing the outside of the acrylic plate 20d. The infrared-emitting diode 30a is placed in contact with and fixed to the inner recessed surface 26a such that the infrared light is emitted toward the inside of the acrylic plate 20d. The angle of the inner recessed surface 26c may be set at any appropriate value depending on the purpose. In the example of FIG. 17, the inner recessed surface 26c is perpendicular to the back surface of the acrylic plate 20d. The infrared-emitting diode 30a is also mounted on the infrared-emitting-diode drive board 31.

The infrared-emitting diode 30a is housed in the deep recess 26a, and the infrared-emitting-diode drive board 31 is fitted into the shallow recess 26b and covers the shallow recess 26b. With this configuration, the back surface of the acrylic plate 20d and the back surface of the infrared-emitting-diode drive board 31 are at substantially the same level.

Similarly to the input device 152 of the third embodiment, the recesses 26 may be formed as separate holes at positions where the infrared-emitting diodes 30a are placed, or may be formed as continuous grooves. Also with the configuration of the fourth embodiment, similarly to the input devices 151 and 152 of the second and third embodiments, the mirrors 23 may be provided to cover the entire side surfaces of the acrylic plate 20d and thereby improve the efficiency of infrared light.

Thus, in the fourth embodiment, a two-tier recess 26 composed of the deep recess 26a for housing the infrared-emitting diode 30a and the shallow recess 26b corresponding to the size of the infrared-emitting-diode drive board 31 is formed in the back surface of the acrylic plate 20d. With this configuration, it is possible to completely embed the infrared-emitting diode 30a and the infrared-emitting-diode drive board 31 in the back surface of the acrylic plate 20d.

In other words, the configuration of the input device 153 of the fourth embodiment makes it possible to make the back surface of the acrylic plate 20d substantially flat and thereby makes it easier to stack the acrylic plate 20d on another component. This in turn makes it possible to reduce the thickness of the input device 153. Also, housing the infrared-emitting-diode drive board 31 in the back surface of the acrylic plate 20d makes it easier to handle the input device 153.

Fifth Embodiment

Figure 18:
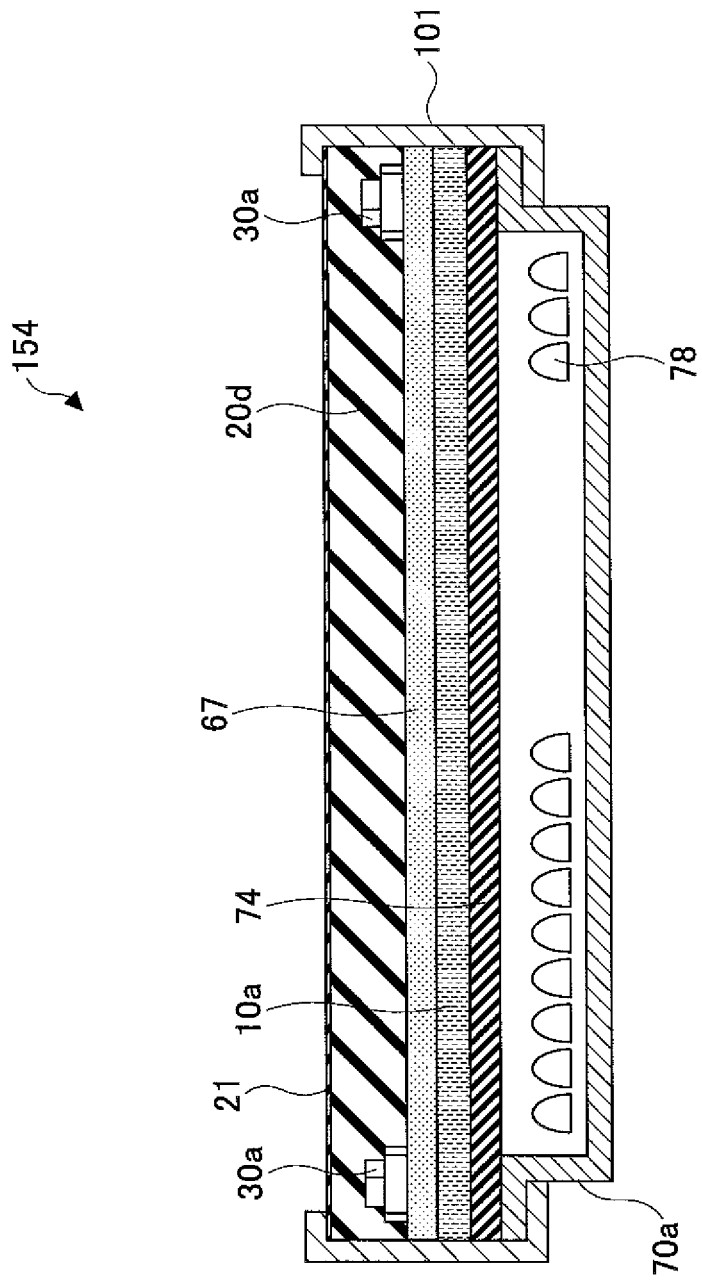
FIG. 18 is a drawing illustrating an exemplary configuration of an input device according to a fifth embodiment.

FIG. 18 is a drawing illustrating an exemplary configuration of an input device 154 according to a fifth embodiment. The input device 154 of the fifth embodiment is different from the input devices 150 through 153 in that a sensor panel 67 is used instead of the infrared camera 61 as the infrared detection unit 60. In the fifth embodiment, the same reference numbers as those used in the above embodiments are assigned to the corresponding components, and descriptions of those components are omitted.

As illustrated in FIG. 18, the input device 154 of the fifth embodiment includes the liquid crystal panel 10a, the acrylic plate 20d, the protection film 21, the infrared-emitting diodes 30a, the sensor panel 67, a backlight 70a, and a casing 101. The backlight 70a includes light-emitting diodes 78 and a diffusion plate 74.

In the input device 154 of the fifth embodiment, the acrylic plate 20d is disposed in the uppermost position and the sensor panel 67 is disposed below the acrylic plate 20d. The protection film 21 may be provided on the front surface of the acrylic plate 20d as necessary. The infrared-emitting diodes 30a are embedded in the acrylic plate 20d. As described in the fourth embodiment, the acrylic plate 20d has the two-tier recesses 26 in the back surface. The liquid crystal panel 10a is provided below the sensor panel 67. Deflection films may be provided on the front and back surfaces of the liquid crystal panel 10a. The backlight 70a is provided below the liquid crystal panel 10a. The backlight 70a includes the light-emitting diodes 78 and the opening of the backlight 70a is covered by the diffusion plate 74. The above components are housed in the casing 101 that forms side walls of the input device 154.

With the input device 154 of the fifth embodiment, a graphical interface displayed on the liquid crystal panel 10a is visible from above through the sensor panel 67 and the acrylic plate 20d. When an image is displayed on the liquid crystal panel 10a, the light-emitting diodes 78 of the backlight 20a are turned on to illuminate the back (lower) surface of the liquid crystal panel 10a. The infrared-emitting diodes 30a disposed in the recesses 26 formed in the back surface of the acrylic plate 20d emit infrared light into the acrylic plate 20d. The infrared light propagates through the acrylic plate 20 and a part of the infrared light goes out of the acrylic plate 20d. Similarly to the first embodiment, when a point on the acrylic plate 20d is touched with, for example, the finger 190, the state of outgoing infrared light changes at the touched point and an input operation is detected by detecting the change in the state of outgoing infrared light.

The input device 154 of the fifth embodiment is different from the input device 150 of the first embodiment in that the infrared light emitted from the acrylic plate 20d is detected by the sensor panel 67 instead of the infrared camera 61. In the variation of the first embodiment illustrated in FIG. 11, the infrared sensor 66 is provided in each pixel of the liquid crystal panel 10a. The fifth embodiment is different even from the variation in that the sensor panel 67 is provided as the infrared detection unit 60 separately from the liquid crystal panel 10a for displaying images.

The sensor panel 67 includes multiple infrared sensors 66 arranged in an array or like pixels. The sensor panel 67 is provided below the acrylic plate 20d and detects infrared light emitted from the acrylic plate 20d. Each of the infrared sensors 66 can detect the strength of the infrared light. Accordingly, with the sensor panel 67 where the infrared sensors 66 are arranged in a grid, it is possible to detect a plane strength distribution of the infrared light emitted from the acrylic plate 20d. Therefore, when the front surface of the acrylic plate 20d is touched to perform an input operation and the radiation intensity of the infrared light is changed at the touched position, it is possible to detect the change in the radiation intensity and to identify the touched position using the sensor panel 67.

On the sensor panel 67, the infrared sensors 66 are arranged like pixels. The size of each pixel of the sensor panel 67 may be the same as or different from the size of each pixel of the liquid crystal panel 10a. That is, depending on the purpose, the size of the infrared sensor 66 may be greater than or less than the size of each pixel of the liquid crystal panel 10a. Generally, the size of the pixels of the liquid crystal panel 10a is small to display images at high resolution. Meanwhile, the sensor panel 67 needs to have a resolution that is sufficient to identify the position of, for example, a selected button. In such a case, the size of each pixel (the infrared sensor 66) of the sensor panel 67 may be smaller than the size of each pixel of the liquid crystal panel 10a.

Although the sensor panel 67 is disposed above the liquid crystal panel 10a in FIG. 18, the sensor panel 67 may instead be disposed below the liquid crystal panel 10a. Since the liquid crystal panel 10a is transparent and transmits infrared light, the sensor panel 67 can detect the infrared light even when it is provided below the liquid crystal panel 10a.

Different from the first embodiment, the backlight 70a includes the light-emitting diodes 78. Alternatively, the backlight 70a may include the fluorescent tubes 72 as in the first embodiment. Also, an edge-lighting backlight may be used as the backlight 70a.

Using the sensor panel 67 as the infrared detection unit 60 makes it possible to reduce the thickness of the entire input device 154. Unlike the infrared camera 61, it is not necessary to dispose the sensor panel 67 at a distance from the acrylic plate 20d to achieve a desired imaging area. Instead, the sensor panel 67 may be disposed in contact with the back surface of the acrylic plate 20d. This also makes it possible to reduce the thickness of the input device 154. Thus, the fifth embodiment makes it possible to provide a very thin input device 154.

Also in the example of FIG. 18, the infrared-emitting diodes 30a are embedded in the acrylic plate 20d as in the input device 153 of the fourth embodiment. However, any one of the acrylic plates 20a through 20c of the input devices 150 through 152 of the first through third embodiments may be used in place of the acrylic plate 20d and the infrared-emitting diodes 30a may be fixed to the acrylic plate in any appropriate manner. Also, the input plate 20 may be made of any material that allows infrared light to propagate through the input plate 20 and is not limited to the acrylic plates 20a through 20d.

Although the liquid crystal panel 10a is used in FIG. 18 as the display panel 10 for displaying a graphical interface, any other appropriate display device such as a plasma display panel or an organic EL display panel may be used as the display panel 10.

Thus, various types of the display panel 10 may be used for the input device 154 of the fifth embodiment, and the input device 154 of the fifth embodiment may be configured to have a small thickness and can be used for various purposes.

Sixth Embodiment

Figure 19A:
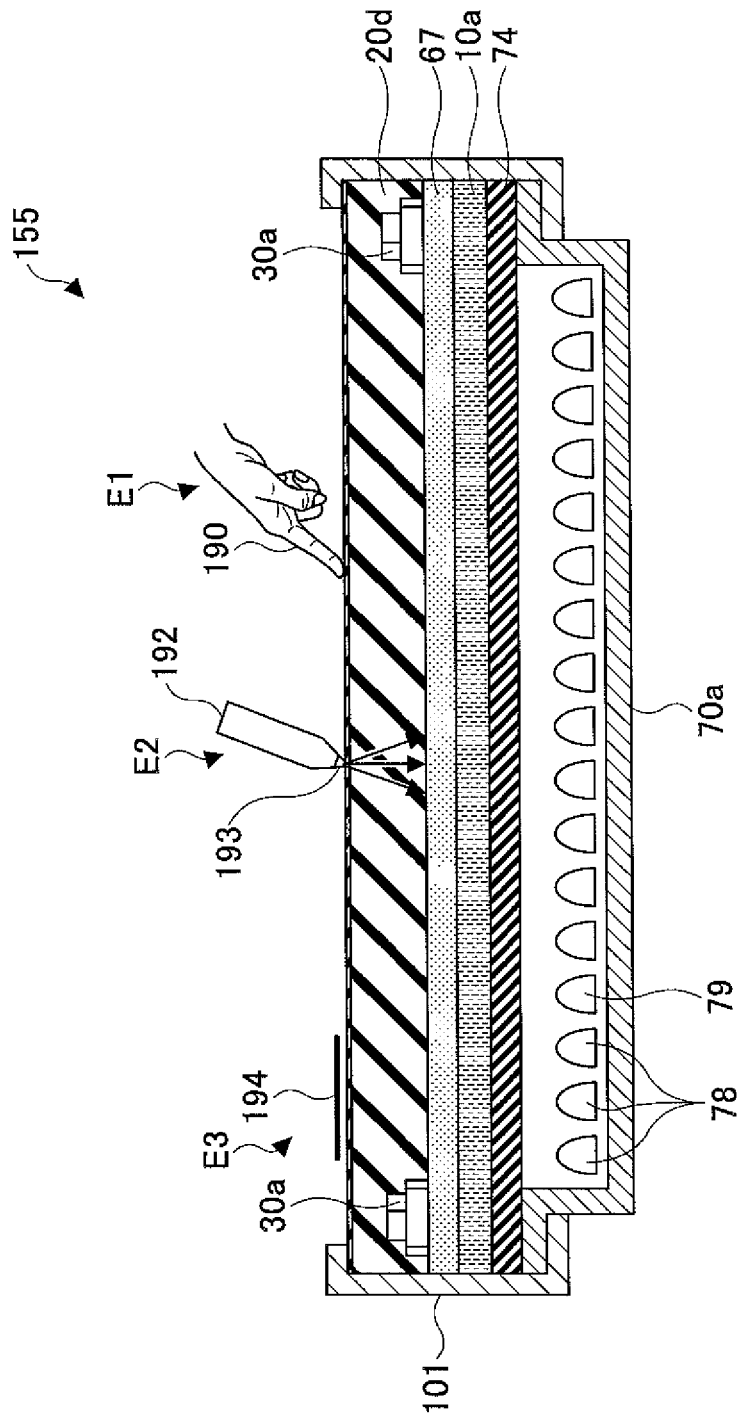
FIG. 19A is a drawing illustrating an exemplary configuration of an input device according to a sixth embodiment.

FIG. 19A is a drawing illustrating an exemplary configuration of an input device 155 according to a sixth embodiment, and FIG. 19B is a timing chart used to describe an exemplary operation of the input device 155 of the sixth embodiment.

As illustrated in FIG. 19A, the input device 155 of the sixth embodiment includes the acrylic plate 20d, the sensor panel 67, the liquid crystal panel 10a, the backlight 70a, and the casing 101. The infrared-emitting diodes 30a are embedded in the acrylic plate 20d. The backlight 70a includes the diffusion plate 74, white light-emitting diodes 78, and an infrared-emitting diode 79. The input device 155 of the sixth embodiment is different from the input device 154 of the fifth embodiment in that the backlight 70a includes the infrared-emitting diode 79 for code reading (the code-reading infrared-emitting diode 79) in addition to the white light-emitting diodes 78. Other components of the input device 155 are substantially the same as those of the input device 154 of the fifth embodiment and therefore their descriptions are omitted here.

The input device 155 of the sixth embodiment can detect, in addition to "touch" input operations with the finger 190, input operations using a pointer 192 including an infrared-emitting diode 193 disposed at the tip and input operations using a QR code 194.

In FIG. 19A, an input operation with the finger 190 is indicated by E1, an input operation with the pointer 192 is indicated by E2, and an input operation with the QR code 194 is indicated by E3. The input device 155 of the sixth embodiment sequentially detects the three types of input operations at different timings.

FIG. 19B is a timing chart illustrating pulses indicating timing of detecting the input operations E1, E2, and E3. In FIG. 19B, the first row indicates read timing pulses of the sensor panel 67, the second row indicates light-emitting timing pulses of the infrared-emitting diode 30a embedded in the acrylic plate 20d, and the third row indicates light-emitting timing pulses of the code-reading infrared-emitting diode 79 of the backlight 70a.

Referring to the first row of FIG. 19B, pulses of the sensor panel 67 are continuously output at a predetermined frequency for driving the infrared sensor 66. In other words, the sensor panel 68 continuously detects touch input operations by the finger 190 at a predetermined frequency (detection frequency). The detection frequency may be, for example, from several tens to several hundred Hz (e.g., 60 Hz or 120 Hz).

Referring to the second row of FIG. 19B, no pulse is output for the infrared sensor 30a every time after five detection pulses for the sensor panel 67 are output. During the period of time when the pulses for the sensor panel 67 and the pulses for the infrared-emitting diode 30a are both output, a process for detecting the input operation E1 with the finger 190 is performed.

Meanwhile, at the timing when the infrared-emitting diode 30a is turned off, i.e., when the sixth pulse of the sensor panel 67 is output, the infrared-emitting diode 79 of the backlight 70a is turned on. At this timing, the QR code 194 placed above the acrylic plate 20d is illuminated with the infrared light emitted from the infrared-emitting diode 79, and the sensor panel 67 detects reflected light from the QR code 194 to read the QR code 194.

After the QR code 194 is read, the infrared-emitting diode 79 is turned off and the infrared-emitting diode 30a is turned on for five consecutive pulses. During this period of time, the sensor panel 67 continuously detects touch input operations with the finger 190.

Then, the infrared-emitting diode 30a is turned off for one pulse. Also, the infrared-emitting diode 79 of the backlight 70a remains turned off. At this timing, a process for detecting an input operation(s) with the pointer 192 is performed. The sensor panel 67 detects infrared light emitted from the infrared-emitting diode 193 provided at the tip of the pointer 192.

Thus, the infrared-emitting diode 30a embedded in the acrylic plate 20d is turned off at predetermined timings to allow scanning of the QR code 194 with the upward infrared light from the infrared-emitting diode 79 of the backlight 70a and detection of the downward infrared light from the infrared-emitting diode 193 of the pointer 192. This configuration makes it possible to detect various types of input operations in addition to touch input operations with the finger 190 and the pen 191.

The pointer 192 may have various shapes as long as the infrared-emitting diode 192 is provided at the tip. Also, the input device 155 may be configured to read various types of codes such as bar codes in addition to the QR code 194. Although the input device 155 of the sixth embodiment is implemented as a variation of the input device 154 of the fifth embodiment including the sensor panel 67, the input device 150 of the first embodiment including the infrared camera 61 may also be configured to detect multiple types of input operations by adding the infrared-emitting diode 79 to the backlight 70 and employing the timing control as illustrated in FIG. 19B.

The sixth embodiment makes it possible to provide a space-saving, low-cost input device that can detect various types of input operations all by itself.

Seventh Embodiment

Figure 20A:
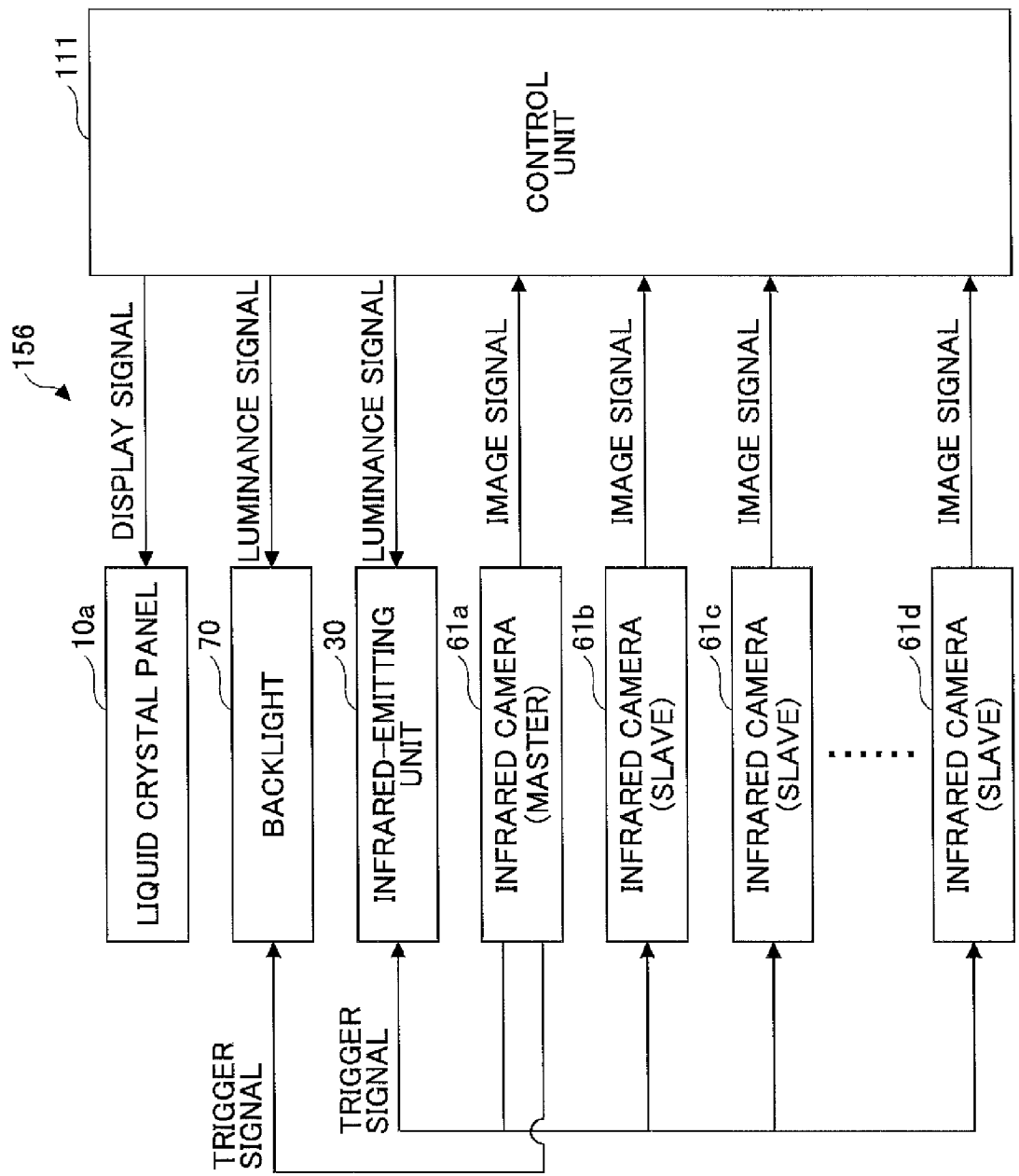
FIG. 20A is a drawing illustrating an exemplary system configuration of an input device according to a seventh embodiment.

An exemplary configuration and exemplary operations of an input device 156 according to a seventh embodiment are described below with reference to FIGS. 20A and 20B. FIG. 20 is a drawing illustrating an exemplary system configuration of the input device 156 of the seventh embodiment.

The input device 156 of the seventh embodiment includes the liquid crystal panel 10a, the backlight 70, the infrared-emitting unit(s) 30, infrared cameras 61a through 61d, and a control unit 111. Different from the system configuration of the first embodiment of FIG. 12, the input device 156 of the seventh embodiment includes multiple infrared cameras 61a through 61d and does not include the inverting unit 120 and the modulation unit 130. Other components of the input device 156 are substantially the same as those of the input device 150 of the first embodiment and therefore their descriptions are omitted here.

The infrared camera 61a is a master infrared camera and the infrared cameras 61b through 61d are slave infrared cameras. In the input device 150 of the first embodiment, the control unit 110 controls all operations of the input device 150. Meanwhile, in the input device 156 of the seventh embodiment, the master infrared camera 61a controls imaging timing. As illustrated in FIG. 20A, the master infrared camera 61a inputs trigger signals to the backlight 70, the infrared-emitting unit 30, and the slave infrared cameras 61b through 61d.

FIG. 20B illustrates output timing of the trigger signals. In FIG. 20B, the first row indicates light-emitting timing of the backlight 70, the second row indicates light-emitting timing of the infrared-emitting unit 30 (infrared-emitting diode 30a), and the third row indicates imaging timing of the infrared cameras 61a through 61d.

As described with reference to FIG. 20A, the master infrared camera 61 outputs a trigger signal (or a synchronization signal) and the slave infrared cameras 61b through 61d obtain images at the same timing according to the trigger signal. Thus, all of the infrared cameras 61a through 61d obtain images at the same timing and therefore the imaging timing can be represented by one waveform in the third row of FIG. 20B.

The infrared-emitting unit 30 operates in synchronization with the same trigger signal output from the master infrared camera 61a, and therefore emits infrared light at the same timing as the imaging timing of the infrared cameras 61a through 61d.

The backlight 70 also operates in synchronization with the master infrared camera 61a as illustrated in FIG. 20A. However, as described in the first embodiment, the backlight 70 emits light at the timing when the infrared-emitting unit 30 is turned off to prevent the infrared light from being mixed with the light from the backlight 70. Accordingly, as illustrated in FIG. 20B, the backlight 70 emits light at timing different from the light-emitting timing of the infrared-emitting unit 30 and the imaging timing of the infrared cameras 61a through 61d.

Thus, in the input device 156 including the infrared cameras 61a through 61d, the master infrared camera 61a controls the infrared cameras 61b through 61d, the infrared-emitting unit 30, and the backlight 70. This configuration makes it possible to appropriately control the input device 156 without performing complicated timing control by the control unit 111.

As described above, an input device according to any one of the first through seventh embodiments can detect a touch input operation based on diffused infrared light from an input plate filled with infrared light. This configuration makes it possible to prevent the infrared light from being blocked and thereby to detect multiple touch points on the input plate. Thus, the above embodiments make it possible to detect multi-touch input operations.

The input plate may be composed of any appropriate material such as an acrylic plate or crystal glass that allows infrared light to propagate. Using an inexpensive acrylic plate as the input plate is particularly preferable to reduce the production costs of the input device. When an acrylic plate is used as the input plate, it is preferable to provide a glass support plate below a display panel to support the soft acrylic plate from below and thereby increase the strength of the input device.

An infrared-emitting unit for emitting infrared light into the input plate may be implemented by an infrared-emitting diode. Multiple infrared-emitting diodes may be bonded to or embedded in the side surfaces of the input plate such that the infrared-emitting diodes are completely in optical contact with the side surfaces. Also, providing multiple infrared-emitting diodes makes it possible to sufficiently fill the input plate with infrared light and thereby makes it possible to reliably detect multi-touch input operations.

Mirrors having reflecting surfaces facing the inside of the input plate may be provided on the side surfaces of the input plate at positions where the infrared-emitting units are not present. Providing the mirrors at positions where the infrared-emitting units are not present makes it possible to prevent leakage of the infrared light and to sufficiently fill the input plate with the infrared light. This in turn makes it possible to accurately detect input operations.

The input plate may have a protrusion with a protrusion surface or a recess with a recessed surface, and the infrared-emitting unit may be implemented by an infrared-emitting diode and placed in contact with the protrusion surface or the recessed surface. This configuration eliminates the need to arrange infrared-emitting diodes and boards on the sides of the input device and thereby makes it easier to handle and carry the input device. Also with this configuration, it is possible to provide mirrors on the entire side surfaces of the input plate to improve the efficiency of infrared light.

The infrared detection unit may be provided in a cell of each pixel of the display panel. This configuration makes it possible to accurately detect input operations at the respective pixels of the display panel without being influenced by optical nonuniformity. Also, this configuration makes it possible to include input detection units in the display panel and thereby makes it possible to reduce the thickness of the input device.

The infrared detection unit may be implemented by an infrared imaging unit disposed below the display panel. This configuration makes it possible to obtain an image indicating an input operation and thereby makes it possible to reliably detect multi-touch input operations with a simple mechanism. The infrared imaging unit may be implemented by an infrared camera including a filter that transmits only infrared light. This configuration makes it possible to detect only infrared light for input detection without being interfered by visible light and thereby makes it possible to provide both an image display function and an input detection function without interference.

The input unit may include multiple infrared detection units. This configuration makes it possible to improve the accuracy of input detection and to reduce the detection range of each of the infrared detection units. This in turn makes it possible to reduce the thickness of the input device.

The infrared detection unit may be implemented by a sensor panel disposed below the input plate and including infrared sensors arranged like pixels. This configuration makes it possible to dispose the infrared detection unit in contact with or close to the input plate and thereby makes it possible to reduce the thickness of the input device.

The display panel may be implemented by a thin, handy liquid crystal panel. A backlight for illuminating the liquid crystal panel may be provided below the liquid crystal panel, and the infrared imaging unit may be provided in the backlight. This configuration makes it possible to dispose the infrared imaging unit within the space occupied by the backlight for illuminating the liquid crystal panel and makes it possible to implement the input device without adding a space for the infrared imaging unit to a device for displaying a graphical interface. The backlight may include a diffusion plate having an opening and the infrared imaging unit may be disposed to detect infrared light through the opening. This configuration prevents diffused infrared light from being attenuated by the diffusion plate, allows the infrared imaging unit to directly receive the diffused infrared light, and thereby makes it possible to detect inputs based on an infrared signal with a sufficient strength. A polarizing film may be provided on the front surface of the diffusion plate and no polarizing film may be provided on the back surface of the liquid crystal plane. This configuration prevents diffused infrared light from being attenuated by the diffusion film and thereby allows the infrared imaging unit to directly receive the diffused infrared light. This in turn makes it possible to obtain a high S/N signal and to accurately detect input operations.

When the display panel is implemented by a liquid crystal panel, the input device may further include a control unit that turns off the infrared-emitting unit when the backlight is turned on, turns on the infrared-emitting unit when the backlight is turned off, and causes the infrared imaging unit to obtain an image while the infrared-emitting unit is turned on. This configuration make is possible to prevent interference between an infrared component of light from the backlight and diffused infrared light emitted from the infrared-emitting unit and thereby makes it possible to more accurately detect input operations. The control unit may be configured to control imaging timing such that the backlight and the infrared-emitting unit are alternately turned on and off in a pulse-like manner This configuration makes it possible to perform graphical interface display and input detection without causing interference and to properly balance the brightness of the displayed graphical interface and the accuracy of input detection.

Preferred embodiments of the present invention are described above. However, the present invention is not limited to the specifically disclosed embodiments, and variations and modifications may be made without departing from the scope of the present invention.

In the above embodiments, it is assumed that the input device 150 is horizontally placed on a surface and the display panel 10 and the input plate 20 constituting an input interface are disposed substantially horizontally. For this reason, in the above embodiments and claims of the present application, positional relationships of components are expressed by terms such as "above", "upward", "below", and "downward" indicating vertical directions. However, the input device 150 of the above embodiments may be disposed such that the display panel 10 and the input plate 20 constituting an input interface are disposed substantially vertically or obliquely, or may be disposed such that the input interface faces downward. Accordingly, terms such as "above", "upward", "below", and "downward" in the above embodiments and claims of the present application may not necessarily indicate actual vertical directions and may indicate relative directions such as "in front of", "behind", "forward", and "backward" with respect to the display panel 10. Thus, when the input interface of the input device 150 is disposed vertically or to face downward, the terms indicating vertical directions may be construed as indicating forward and backward directions. The present invention also encompasses such variations.

Two or more of the first through seventh embodiments may be combined depending on the purpose and usage. For example, the second through fourth embodiments may be combined with any one of the first and fifth through seventh embodiments. Thus, depending on the purpose, two or more of the above embodiments may be combined unless they contradict with each other.

INDUSTRIAL APPLICABILITY

The present invention is applicable to an input device such as a touch panel that displays an input screen and is operated by touching the input screen and is also applicable to an input device employing multi-touch input.

The present international application claims priority from Japanese Patent Application No. 2009-104757 filed on Apr. 23, 2009, the entire contents of which are hereby incorporated herein by reference.

The invention claimed is:

1. An input device, comprising:
a display panel including an upper glass substrate, a liquid crystal layer, and a lower glass substrate, and configured to display a graphical interface;
an input plate disposed above the display panel and composed of a material that transmits the graphical interface and allows infrared light to propagate therethrough;
an infrared-emitting unit disposed in contact with the input plate and configured to emit the infrared light into the input plate via a contact surface of the input plate;
a support plate disposed below the display panel;
an infrared detection unit disposed below the input plate and configured to detect diffused light of the infrared light which is generated at the input plate when the input plate is touched;
a backlight disposed below the display panel and configured to illuminate the display panel; and
a control unit, wherein
the infrared detection unit is an infrared imaging unit and the display panel is a liquid crystal panel;
the infrared imaging unit is disposed in the backlight; and
the control unit is configured
to turn off the infrared-emitting unit when the backlight is turned on,
to turn on the infrared-emitting unit when the backlight is turned off, and
to cause the infrared imaging unit to obtain an image while the infrared-emitting unit is turned on.

2. The input device as claimed in claim 1, wherein the input plate is an acrylic plate or crystal glass.

3. The input device as claimed in claim 2, wherein the support plate is a glass plate.

4. The input device as claimed in claim 1, wherein the contact surface comprises side surfaces of the input plate; and
the infrared-emitting unit comprises infrared-emitting diodes bonded to or embedded in the side surfaces of the input plate.

5. The input device as claimed in claim 1, wherein the contact surface comprises protrusion surfaces or recessed surfaces formed on or in a back surface of the input plate; and
the infrared-emitting unit comprises infrared-emitting diodes bonded to the protrusion surfaces or the recessed surfaces.

6. The input device as claimed in claim 4, further comprising:
mirrors disposed on the side surfaces of the input plate at positions where the infrared-emitting unit is not present, reflecting surfaces of the mirrors facing inside of the input plate.

7. The input device as claimed in claim 5, further comprising:
mirrors disposed on the side surfaces of the input plate such that reflecting surfaces of the mirrors face inside of the input plate.

8. The input device as claimed in claim 1, wherein the infrared imaging unit is an infrared camera including a filter that transmits only the infrared light.

9. The input device as claimed in claim 1, wherein
the backlight includes a diffusion plate having an opening in a surface thereof; and
the infrared imaging unit is disposed to detect the infrared light through the opening.

10. The input device as claimed in claim 9, further comprising:
a polarizing film disposed on a front surface of the diffusion plate and having an opening at a position corresponding to the opening of the diffusion plate; and
no polarizing film is provided on a back surface of the liquid crystal panel.

11. The input device as claimed in claim 1, wherein the control unit is configured to control imaging timing such that the backlight and the infrared-emitting unit are alternately turned on and off in a pulse-like manner.

12. An input device, comprising:
a display panel including an upper glass substrate, a liquid crystal layer, and a lower glass substrate, and configured to display a graphical interface;
an input plate disposed above the display panel and composed of a material that transmits the graphical interface and allows infrared light to propagate therethrough;
an infrared-emitting unit disposed in contact with the input plate and configured to emit the infrared light into the input plate via a contact surface of the input plate;
a support plate disposed below the display panel;
an infrared detection unit disposed below the input plate and configured to detect diffused light of the infrared light which is generated at the input plate when the input plate is touched; and
a backlight disposed below the display panel and configured to illuminate the display panel, wherein
the infrared detection unit comprises a plurality of infrared imaging units disposed below the display panel;
the display panel is a liquid crystal panel;
one of the infrared imaging units is a master infrared imaging unit; and
other ones of the infrared imaging units and the backlight are pulse-controlled in synchronization with the master infrared imaging unit.

* * * * *